United States Patent
Ogita et al.

(10) Patent No.: US 7,402,104 B2
(45) Date of Patent: Jul. 22, 2008

(54) GAME PERFORMING METHOD, GAME APPARATUS, STORAGE MEDIUM, DATA SIGNAL AND PROGRAM

(75) Inventors: Masatoshi Ogita, Osaka (JP); Kazumi Yamabe, Osaka (JP); Keita Takahashi, Tokyo (JP)

(73) Assignee: NAMCO BANDAI Games Inc., Tokyo (JP)

( * ) Notice: Subject to any disclaimer, the term of this patent is extended or adjusted under 35 U.S.C. 154(b) by 701 days.

(21) Appl. No.: 10/944,200

(22) Filed: Sep. 20, 2004

(65) Prior Publication Data

US 2005/0101365 A1    May 12, 2005

(30) Foreign Application Priority Data

Sep. 25, 2003    (JP) ............................. 2003-333580

(51) Int. Cl.
   *A63F 13/00*    (2006.01)
(52) U.S. Cl. .................... 463/32; 463/1; 463/5
(58) Field of Classification Search ............. 463/4, 463/23
   See application file for complete search history.

(56) References Cited

U.S. PATENT DOCUMENTS

2003/0083117 A1*    5/2003    Rupert et al. ................. 463/4

2003/0162592 A1*    8/2003    Takahashi ...................... 463/33

FOREIGN PATENT DOCUMENTS

JP    2000-113225 A    4/2000

OTHER PUBLICATIONS

Ryan Hsu's Examiner Affidavit, Apr. 24, 2007.*
Gamespot Review of FIFA 99 by Josh Smith, Dec. 9, 1998.*
Gamespot Review of FIFA 99 by Nelson Taruc, Dec. 10, 1998.*

* cited by examiner

*Primary Examiner*—John M Hotaling, II
*Assistant Examiner*—Jeffrey Wong
(74) *Attorney, Agent, or Firm*—Oliff & Berridge, PLC

(57) ABSTRACT

A game performing method for executing a game by arranging a plurality of objects comprising a plurality of objects to be stuck and an operation object, in a virtual space, controlling rolling and movement of the operation object according to a player's input, and rolling and moving the operation object while sticking the objects which the operation object comes in contact with, comprises: setting a plurality of first displacement points capable of displacing only in predetermined radial directions different from each other, from a reference point respectively; displacing the first displacement point adjacent to a contact position, in the predetermined radial direction when the operation object comes in contact with the object to be stuck; setting a second displacement point in a position which meets a predetermined distance condition; and controlling the rolling of the operation object based on rolling surface reference points comprising the first and second displacement points.

17 Claims, 14 Drawing Sheets

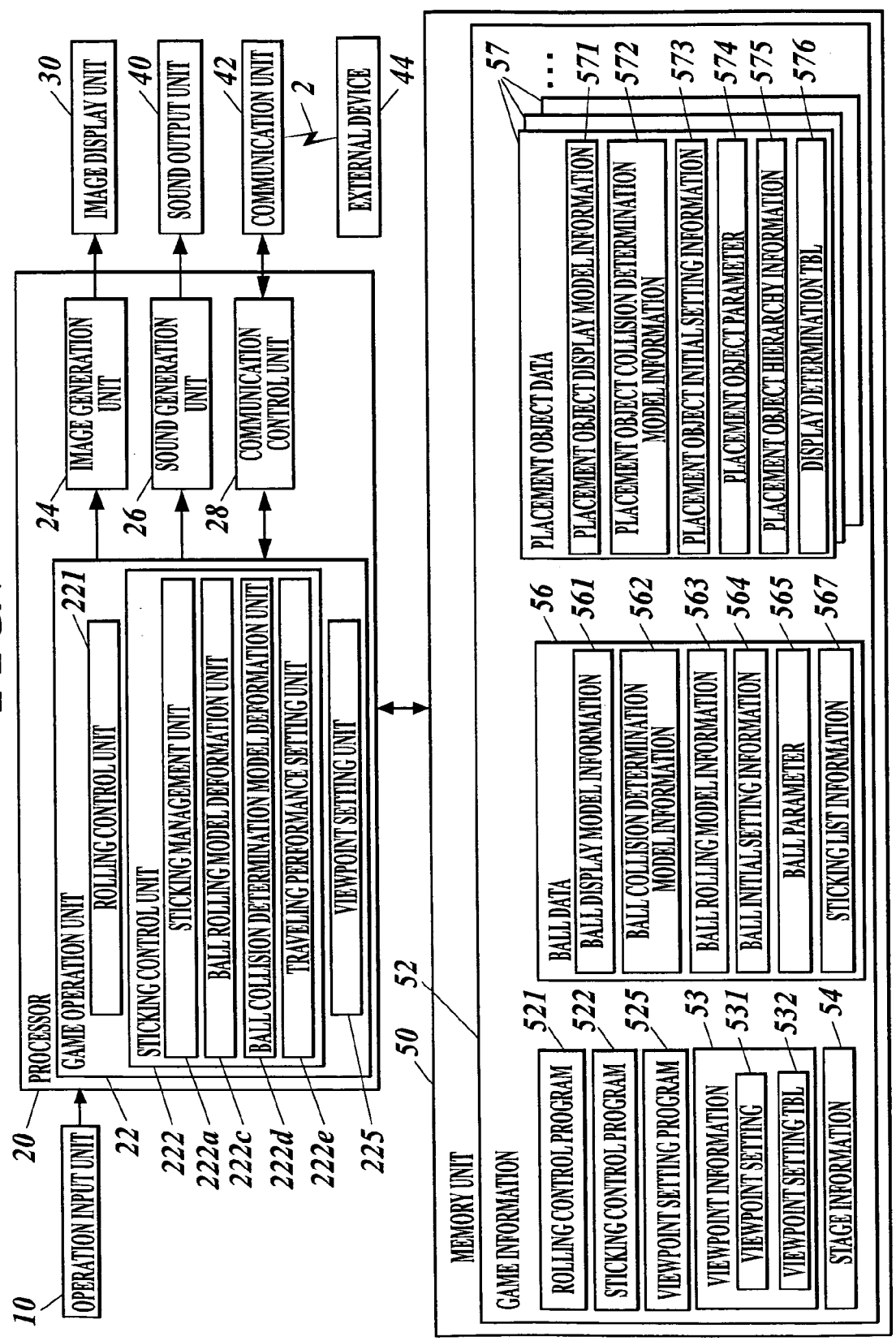

FIG. 8

VIEWPOINT SETTING TBL 532

| CONDITION ON CURRENT VOLUME Db OF BALL | VIEWPOINT SETTING VALUE | DISPLAY LEVEL |
|---|---|---|
| 10 TO 50 | VIEW 1 | 1 |
| TO 80 | VIEW 2 | 2 |
| TO 200 | VIEW 3 | 3 |
| TO 500 | VIEW 4 | 4 |
| TO 800 | VIEW 5 | 5 |
| ⋮ | ⋮ | ⋮ |

STICKING LIST INFORMATION 567

| STICKING ORDER | PLACEMENT OBJECT ID | STICKING POSITION INFORMATION | VOLUME SETTING VALUE |
|---|---|---|---|
| 1 | CIGARETTE BUTT 01 | (X1,Y1,Z1, θx1, θy1, θz1) | 5 |
| 2 | CARAMEL 02 | (X2,Y2,Z2, θx2, θy2, θz2) | 15 |
| 3 | EMPTY CAN 33 | (X3,Y3,Z3, θx3, θy3, θz3) | 55 |
| 4 | SANDAL 01 | (X4,Y4,Z4, θx4, θy4, θz4) | 125 |
| 5 | INSECT 08 | (X5,Y5,Z5, θx5, θy5, θz5) | 88 |
| ⋮ | ⋮ | ⋮ | ⋮ |

| DISPLAY DETERMINATION TBL | | 576 |
|---|---|---|
| MAXIMUM DISPLAY LEVEL | 2 | 576a |
| DISPLAY FLAG | 0 | 576b |

VIEWPOINT CM1

VIEWPOINT CM2

VIEWPOINT CM1

VIEWPOINT CM2

GAME PERFORMING METHOD, GAME APPARATUS, STORAGE MEDIUM, DATA SIGNAL AND PROGRAM

BACKGROUND OF THE INVENTION

1. Field of the Invention

This invention relates to a game executing method for executing a game for arranging a plurality of objects comprising a plurality of objects to be stuck and an operation object, in a 3D virtual space, controlling rolling and movement of the operation object according to operation input by a player, and rolling and moving the operation object while sticking the objects to be stuck which are contacted with the operation object.

2. Description of Related Art

Conventionally, various types of games have been proposed. As one category of these games, there is a category so called action adventure game. It is the game that a player controls own character to run the whole course of a predetermined stage within a time limit, while fending off or eliminating obstructions or the attack of enemies. The player makes the own character run through the stage while jumping or hopping to enjoy exhilarating feeling, by making full use of operation techniques for the own character. Then, the player competes scores with the time required for completing the stage or the number of items obtained in the stage.

As shown in JP-Tokukai 2000-113225A, there is also the game that a player controls a monster to walk around while destroying buildings or the like and competes scores with the way of destruction. In such game, it is important how the destruction is represented realistically. Each of display blocks to be scattered after the collapse is previously set as collective movable display elements, and elements to be destroyed, such as buildings or the like, are displayed by the display elements. Then, when the building is destroyed by the attack of the monster controlled by the player and so on, it seems that concrete blocks fall by the collapse, by separating the display elements.

As above, in the conventional action adventure games, the setting is mostly that the own character controlled by a player is in the motif of the main character in the game story (in some case, the main character is a machine or the like controlled by a player) and the own character itself runs the whole course of a game stage. Although there are some differences in game stories, there are not large differences as for the development such as progression by fending off or eliminating obstructions or enemies.

SUMMARY OF THE INVENTION

The present invention is made in view of the above problem. It is an object of the present invention to provide a new game the motif of which is to roll an object growing larger by the snowball effect while sticking other objects which the object comes in contact with, thereto. Further, it is an object of the present invention to represent the rolling of the object the surface shape of which becomes intricate by sticking other objects thereto, more realistically, with a low calculation load.

In order to solve the above problem, according to a first aspect of the present invention, a game performing method for executing a given game by arranging a plurality of objects comprising a plurality of objects to be stuck and an operation object, in a 3D virtual space, controlling rolling and movement of the operation object according to operation input by a player, and rolling and moving the operation object while sticking the objects to be stuck which the operation object comes in contact with, comprises:

setting a plurality of first displacement points capable of displacing only in predetermined radial directions from a reference point in the operation object respectively, the radial directions being different from each other;

displacing the first displacement point in the predetermined radial direction when the operation object comes in contact with the object to be stuck, the first displacement point to be displaced being adjacent to a position where the operation object comes in contact with the object to be stuck;

setting a second displacement point in a position where a distance from the reference point to a predetermined part of the object stuck to the operation object meets a predetermined distance condition; and controlling the rolling of the operation object on a basis of rolling surface reference points comprising the first displacement point and the second displacement point.

According to a second aspect of the present invention, a game apparatus for executing a given game by arranging a plurality of objects comprising a plurality of objects to be stuck and an operation object, in a 3D virtual space, controlling rolling and movement of the operation object according to operation input by a player, and rolling and moving the operation object while sticking the objects to be stuck which the operation object comes in contact with, comprises:

a first displacement point setting section for setting a plurality of first displacement points capable of displacing only in predetermined radial directions from a reference point in the operation object respectively, the radial directions being different from each other, and for displacing the first displacement point in the predetermined radial direction when the operation object comes in contact with the object to be stuck, the first displacement point to be displaced being adjacent to a position where the operation object comes in contact with the object to be stuck;

a second displacement point setting section for setting a second displacement point in a position where a distance from the reference point to a predetermined part of the object stuck to the operation object meets a predetermined distance condition; and a rolling control section for controlling the rolling of the operation object on a basis of rolling surface reference points comprising the first displacement point set by the first displacement point setting section and the second displacement point set by the second displacement point setting section.

According to a third aspect of the present invention, a storage medium has information recorded thereon, when the information is loaded onto an operating device, the information making the operating device execute the method of the first aspect of the present invention.

According to a fourth aspect of the present invention, a data signal embodied in a carrier wave, comprises information used for executing the method of the first aspect of the present invention.

According to a fifth aspect of the present invention, a program, when the program is loaded onto an operating device, makes the operating device execute the method of the first aspect of the present invention.

According to the method, the apparatus, the storage medium, the data signal, or the program of the first, second, third, fourth, or fifth aspect of the present invention, by continuously sticking the objects to the operation object which is rolled and moved according to the operation input by the player when the operation object comes in contact with the objects to be stuck, it is possible to realize a new game the motif of which is to roll the object growing larger by the snowball effect while sticking other objects which the object comes in contact with, to the surface thereof.

Further, according to the method, the apparatus, the storage medium, the data signal, or the program of the first, second, third, fourth, or fifth aspect of the present invention, it is possible to set the plurality of first displacement points so as to surround the reference point in the operation object, and possible to displace the first displacement point adjacent to the position where the operation object comes in contact with the object to be stuck. That is, it is possible to simply form the outer shape of the operation object to which the objects are stuck intricately, by the limited number of first displacement points. Further, it is possible that the existence of the characteristic portions of the stuck objects is reflected in the shape formed by the first displacement points.

Therefore, by calculating and controlling the rolling of the operation object on the basis of the rolling surface reference points (which represents the points contacting the ground during the rolling) including the first displacement points and the second displacement points, the element of the ragged rolling fluctuation which is caused by the second displacement points and generates the relative great shaking, is added to the irregular rolling movement based on the shape formed by the first displacement points. Accordingly, it is possible to realistically represent the rolling of the operation object which is formed in a intricate convexo-concave shape. Further, by limiting the number of the first displacement points, it is possible to calculate the rolling with much lower calculation loads in comparison with the case where the rolling is calculated by using a display model.

Preferably, in the method of the first aspect of the present invention, the setting the second displacement includes selecting a predetermined number of positions of parts among predetermined parts of the objects stuck to the operation object, in descending order of the distance from the reference point, and sets the second displacement point in the selected position.

According to the above method, it is possible to set the second displacement points to the predetermined number of portions which is farther from the reference point in the operation object. That is, it is possible that the existence of the characteristic portions protruding outward because of the stuck objects, while limiting the number of the portions. Therefore, it is possible to inhibit the increase of the calculation loads, while adding the irregular ragged rolling fluctuation caused by the convex portions, to the rolling of the operation object.

Preferably, in the method of the first aspect of the present invention, the setting the second displacement includes determining whether or not the second displacement point is set in the position of the predetermined part of the object stuck to the operation object on a basis of a distance from the reference point to the first displacement point.

According to the above method, when the second displacement point is set to the predetermined portion of the object to be stuck, it is possible to determine whether or not the setting is carried out by referring to the distance from the reference point to the first displacement point. For example, by comparing to the distance of the neighboring first displacement point, it is possible to determine whether or not the setting is carried out, depending on whether or not the predetermined portion protrudes more than the shape formed by the first displacement points. Therefore, it is possible to prevent the setting of the second displacement points to the position not suitable for an original purpose.

Preferably, in the method of the first aspect of the present invention, a convex identification point based on a shape of the object to be stuck is set beforehand in the object to be stuck, and the predetermined part of the object to be stuck is the convex identification point.

According to the above method, it is possible to search the candidate position for the setting of the second displacement point among the predetermined portions. Therefore, it is possible to decease the processing load. Further, the degree of the convex of the object to be stuck, which is reflected in the rolling of the operation object, is adjusted by the setting of the convex identification point, and accordingly the degree of the shaking of the ragged rolling caused by the second displacement points is modified. Consequently, it is possible to adjust the difficulty level of a game.

Preferably, in the method of the first aspect of the present invention, a representative point is set beforehand in the object to be stuck, and the displacing the first displacement point includes selecting the first displacement point to be displaced on a basis of a positional relationship between a representative point of the contacted object to be stuck and the first displacement point.

According to the above method, it is possible to select and limit the first displacement points to be displaced. Therefore, it is possible to appropriately set the degree of reflection of the shape of the object to be stuck in the shape formed by the first displacement points. Further, by appropriately setting the position of the representative point, it is possible to more appropriately reflect the shape of the object to be stuck in the first displacement points.

Preferably, in the method of the first aspect of the present invention, the displacing the first displacement point includes deciding displacement magnitude on a basis of a distance between the representative point of the contacted object to be stuck and the first displacement point.

According to the above method, by deciding the displacement magnitude on the basis of the distance between the representative point of the contacted object to be stuck and the first displacement point, it is possible to appropriately set the degree of the reflection of the shape of the object to be stuck in the shape formed by the first displacement points.

According to a sixth aspect of the present invention, a game performing method for executing a given game by moving an operation object according to operation input by a player, the operation object comprising a predetermined number of displacement points for executing determination of a contact between the operation object and an object arranged in a 3D virtual space, the method comprises displacing the displacement point on a basis of a position of a representative point of the arranged object, when it is determined that the operation object comes in contact with the arranged object.

According to a seventh aspect of the present invention, a game apparatus for executing a given game by moving an operation object according to operation input by a player, the operation object comprising a predetermined number of displacement points for executing determination of a contact between the operation object and an object arranged in a 3D virtual space, the apparatus comprises a section for displacing the displacement point on a basis of a position of a representative point of the arranged object, when it is determined that the operation object comes in contact with the arranged object.

According to an eighth aspect of the present invention, a storage medium has information recorded thereon, when the information is loaded onto an operating device, the information making the operating device execute the method of the sixth aspect of the present invention.

According to an ninth aspect of the present invention, a data signal embodied in a carrier wave, comprises information used for executing the method of the sixth aspect of the present invention.

According to a tenth aspect of the present invention, a program, when the program is loaded onto an operating device, makes the operating device execute the method of the sixth aspect of the present invention.

According to the method, the apparatus, the storage medium, the data signal, or the program of the sixth, seventh, eighth, ninth, or tenth aspect of the present invention, when it is determined that the object arranged in the virtual space comes in contact with the operation object, it is possible to displace the displacement point of the operation object and change the position of the displacement point, according to the position coordinate of the representative point of the contacted object. That is, it is possible to arrange the displacement point according to the result of the contact between the operation object and other objects, and reflect the arrangement in the game progression that follows.

According to an eleventh aspect of the present invention, a game performing method for executing a given game by arranging an operation object comprising a predetermined number of displacement points for executing determination of a contact, and an object to be stuck which is capable of being stuck to the operation object, in a 3D virtual space, and moving the operation object according to operation input by a player, the method comprises displacing the displacement point on a basis of a position of a representative point of the object to be stuck, when the object is stuck to the operation object.

According to a twelfth aspect of the present invention, a game apparatus for executing a given game by arranging an operation object comprising a predetermined number of displacement points for executing determination of a contact, and an object to be stuck which is capable of being stuck to the operation object, in a 3D virtual space, and moving the operation object according to operation input by a player, the apparatus comprises displacing the displacement point on a basis of a position of a representative point of the object to be stuck, when the object is stuck to the operation object.

According to a thirteenth aspect of the present invention, a storage medium has information recorded thereon, when the information is loaded onto an operating device, the information making the operating device execute the method of the eleventh aspect of the present invention.

According to a fourteenth aspect of the present invention, a data signal embodied in a carrier wave, comprises information used for executing the method of the eleventh aspect of the present invention.

According to a fifteenth aspect of the present invention, a program, when the program is loaded onto an operating device, makes the operating device execute the method of the eleventh aspect of the present invention.

According to the method, the apparatus, the storage medium, the data signal, or the program of the eleventh, twelfth, thirteenth, fourteenth, or fifteenth aspect of the present invention, when the operation object operated by the player is displayed in the state where the object (for example, an equipment item or the like) is stuck thereto, it is possible to displace the displacement point of the operation object and change the position of the displacement point according to the position coordinate of the representative point of the stuck object. That is, it is possible to arrange the displacement point according to the result of the sticking between the operation object and other object, and reflect the arrangement in the game progression that follows.

Hereupon, the storage medium is, for example, a CD-ROM, a MO, a memory card, a DVD, a hard disk, an IC memory, or the like, which is capable of being read by an apparatus similar to a computer. The connection topology of the storage medium is not considered, and may be either detachable to the apparatus or connected to the apparatus via a communication line.

BRIEF DESCRIPTION OF THE DRAWINGS

The present invention will become more fully understood from the detailed description given hereinafter and the accompanying drawing given by way of illustration only. However thus are not intended as a definition of the limits of the present invention, and wherein:

FIG. 7 is a functional block diagram showing an example of a functional configuration of the home game unit to which the present invention is applied;

FIG. 8 is a diagram showing an example of a data configuration of a viewpoint setting TBL (table);

FIG. 9 is a diagram showing an example of a data configuration of a sticking list information;

FIG. 10 is a diagram showing an example of a data configuration of a display determination TBL;

PREFERRED EMBODIMENTS OF THE INVENTION

Hereinafter, the embodiment of the present invention will be explained with reference to the drawings. In the present embodiment, the case where a "big ball rolling" game for competing how to enlarge a ball object, which is the object to be controlled, by sticking other object thereto by the snowball effect is executed will be described as an example. Incidentally, the application of the present invention is not limited to this game. As long as the motif of a game is, for example, to roll an object, the present invention can be applied to such game, regardless of the setting of characters or game stories.

[Description of Configuration]

Figure 1:
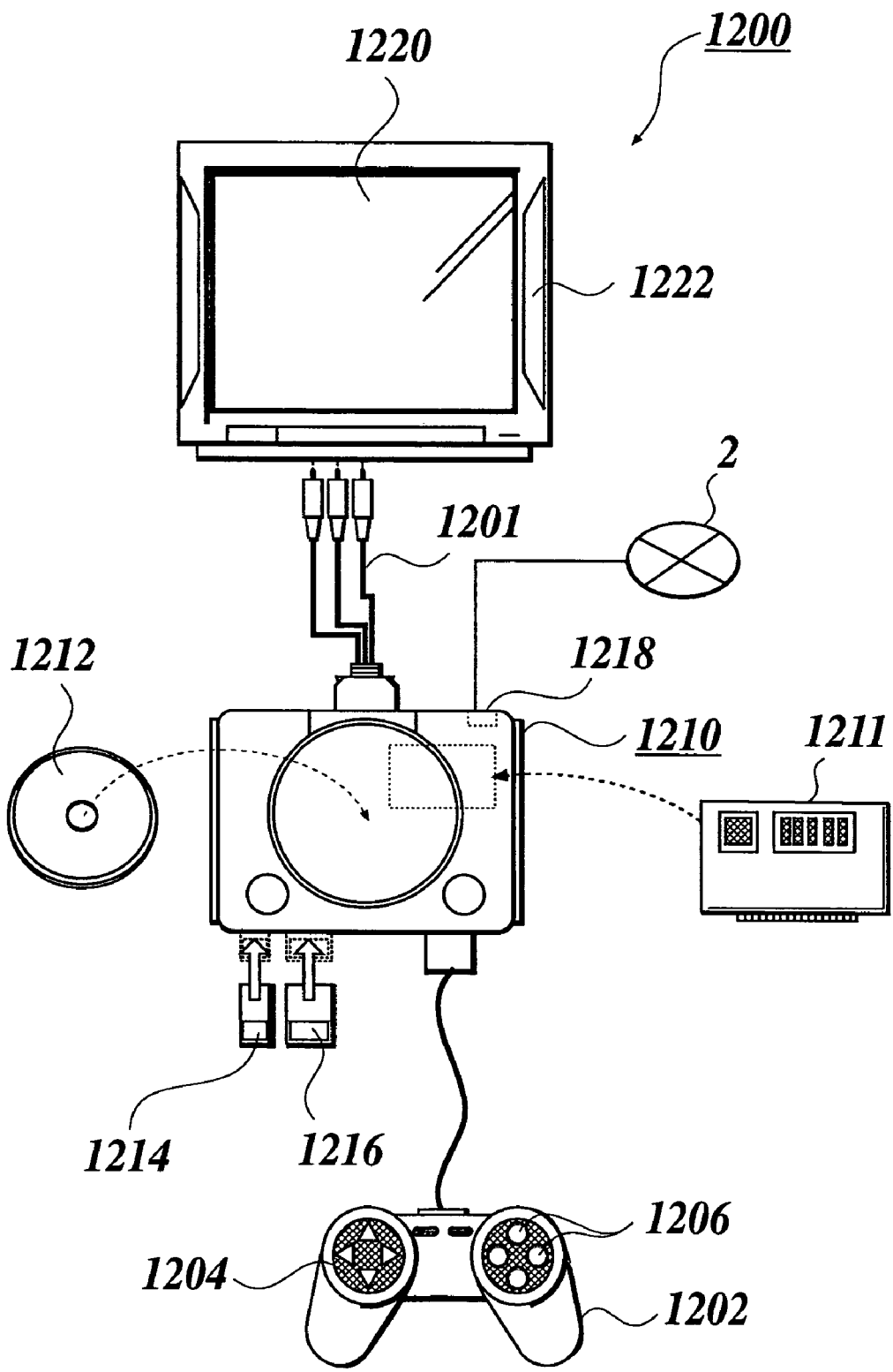
FIG. 1 is a diagram showing an example of the configuration of a home game unit to which the present invention is applied.

First, the configuration of the present embodiment will be described. FIG. 1 is a diagram showing an example of the configuration of a home game unit to which the present invention is applied. As shown in FIG. 1, the home game unit 1200 has a game controller 1202, a main unit 1210 and a display 1220 equipped with a speaker 1222. The game controller 1202 is connected to the main unit 1210, and the display 1220 is connected to the main unit 1210 with a cable 1201 capable of transferring an image signal, an audio signal and the like.

The game controller 1202 comprises a direction key 1204 and button switches 1206 for a player to input game operations, and the game controller 1202 outputs an operation input signal to the main unit 1210.

The main unit 1210 comprises a control unit such 1211 on which a CPU, an IC memory and the like are mounted, and a reader for the information storage medium such as CD-ROM 1212 or the like. The main unit 1210 executes various types of game processing based on the program or data read from the CD-ROM 1212 or the like and an operation signal inputted from the game controller 1202, and generates the image signal of a game image and the audio signal of a game sound.

The main unit 1210 outputs the generated image signal and the generated audio signal to the display 1220, displays a game image on the display 1220, and outputs the game sound from the speaker 1222. A player can enjoy a "big ball rolling" game by controlling the game controller 1202, while watching the game screen displayed on the display 1220.

The game information comprising a program, data and the like necessary for the main unit 1210 to execute the game processing, is stored in, for example, the CD-ROM 1212, an IC memory 1214, a memory card 1216 and the like, which are information storage media capable of being freely attached to and detached from the main unit 1210. Alternatively, the game information may be obtained from an external device by the connection of the main unit 1210 with a communication line 2 through a communication device 1218 installed in the main unit 1210.

Incidentally, "the communication line" hereupon indicates a communication path capable of transferring data. That is, the communication line 2 includes communication networks such as telephone communication networks, cable networks and the Internet as well as LANs such as private lines (private cables) for direct connection and Ethernet (registered trademark). Moreover, it does not care whether the way of communication is of a wired system or a radio system.

[Description of Game Contents]

Figure 2A:
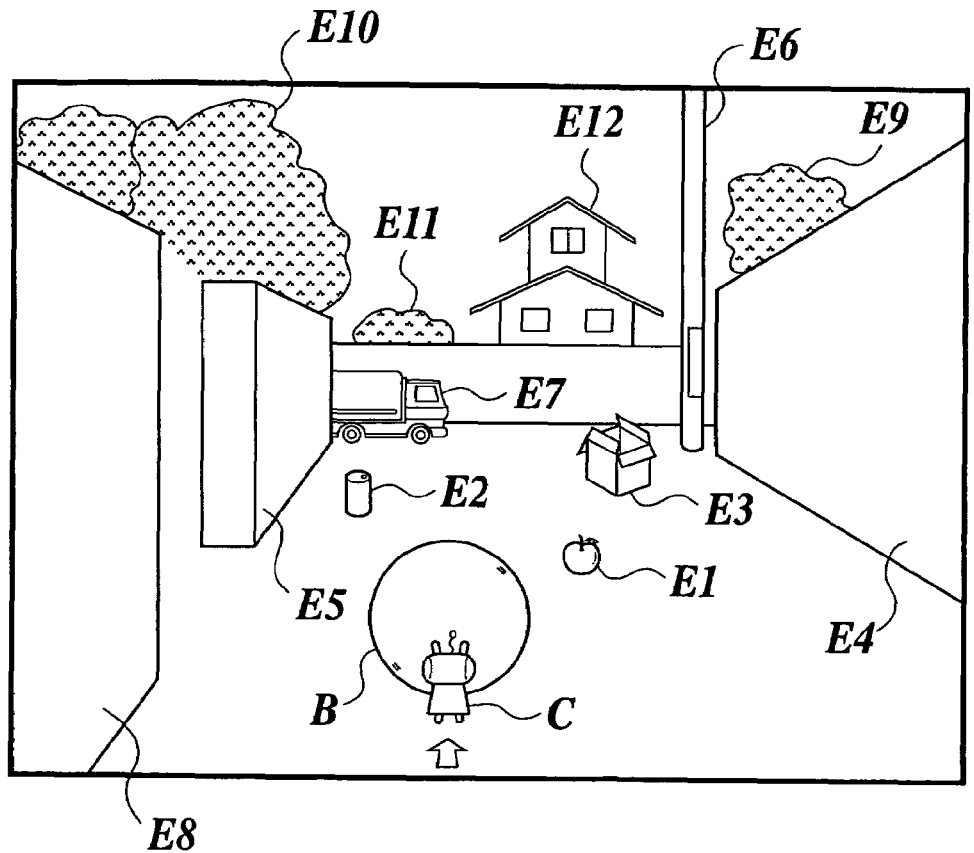
FIG. 2A is a diagram showing an example of a game screen.

FIG. 2A is a diagram showing an example of a game screen in the present embodiment. The game screen is displayed as, for example, a 3DCG image made by polygons, which is a 3D virtual space in which objects are arranged and which is viewed from a predetermined viewpoint (a virtual camera).

In the present embodiment, The setting is that the player becomes a character C and the character C walks in a game while rolling a magical ball B, the surface of which objects being come in contact therewith are stuck to. Although the character C pushes the ball B artificially, the ball B corresponds to the operation object the movement of which is controlled by the player. The direction for rolling the ball B is controlled by the direction key 1204 of the game controller 1202, and an accelerator and a break are controlled by the button switches 1206.

Figure 2B:
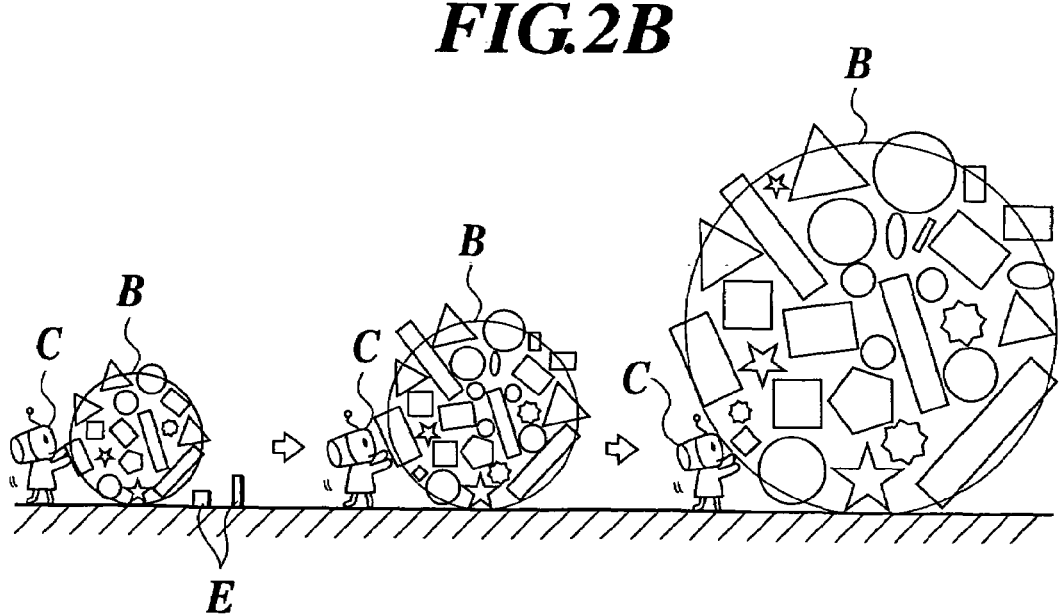
FIG. 2B is a diagram showing a state in which a ball B is enlarged by the snowball effect.

The player makes the ball effectively collide a various types of placement objects E arranged in a town, and enlarges the ball B by the snowball effect by sticking the placement objects E which are collided (refer to FIG. 2B). The ball B can stick the object the size of which is not larger than a predetermined size, according to the size of the ball B. However, the ball B cannot stick the object the size of which is larger than the predetermined size. For example, in the case of FIG. 2A, the ball B can stick an apple (E1) and an empty can 33 (E2). However, the ball B cannot stick a cardboard box (E3), walls (E4, E5 and E8), an utility pole (E6), a truck (E7), a house (E12), and the like, because the sizes of these objects are lager than the size of the ball B. Therefore, the player has to enlarge the ball B while effectively determining and avoiding the objects E the sizes of which does not seem to be stuck.

Figure 3:
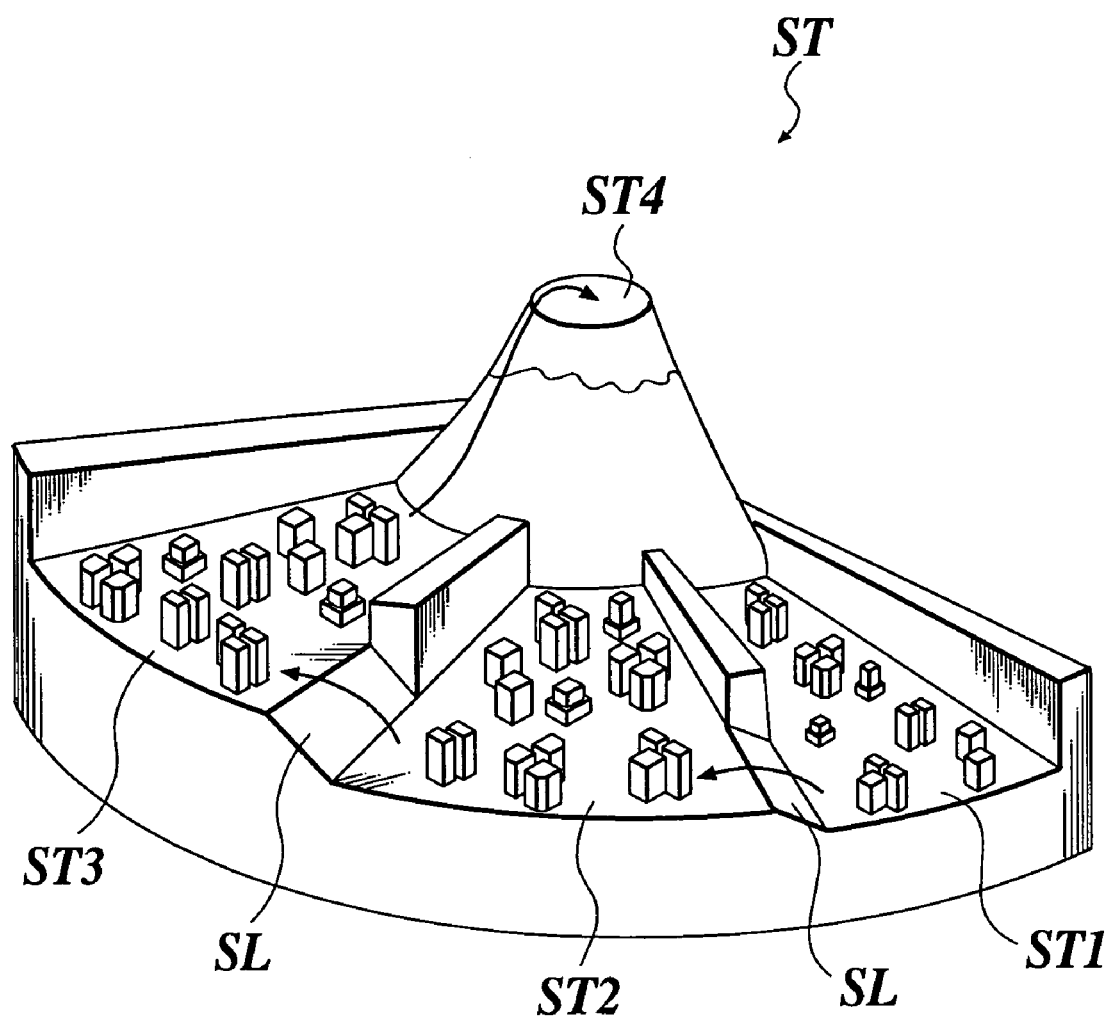
FIG. 3 is a conceptual diagram showing an example of the configuration of a game stage.

FIG. 3 is a conceptual diagram showing an example of the configuration of a game stage. In the present embodiment, the game stage comprises stages ST1 to ST4. The sizes of the placement objects E become larger for every advance of the stage. For example, in the stage ST1, the placement objects E of the size of an empty can, a baseball, a tennis racket, a TV and the like are arranged. Then, in the stage ST2, the placement objects E of the sizes of a bench, a refrigerator, a post box, a car, a taxi and the like are arranged. Further, in the stage ST3, the placement objects E of the sizes of a truck, a bus, a train, a house or and the like are arranged. In this manner, for every advance of the stage, the objects the sizes of which are larger than those of the previous stage are set as the placement objects E. Of course, the placement objects the sizes of which are not suitable for being stuck in each stage are also set arbitrarily, in order to increase the attraction of the game.

The stages ST1 to ST3 are separated by slopes SL respectively. If the ball B completely goes up the slope SL, the ball B can advance to the next stage. Because the maximum velocity and the acceleration of the ball B are increased according to the size of the ball B, the maximum velocity and the acceleration are increased by enlarging the ball B by sticking the placement objects E to the ball B efficiently. Therefore, the ball B goes up the slope SL with great force and advances to the next stage.

The ball B firstly sticks the placement objects E of the sizes of a cigarette butt, an empty can or the like. Along with the enlarging, the ball B sticks a bicycle, a post box, a bus or the like. Finally, the ball B sticks objects of the sizes of a house, an utility pole or the like, and grows larger while destroying the town. Then, at last, the player puts the enlarged ball B into the volcanic vent ST4 of Mt. Fuji, and prevents the eruption to clear the game. Incidentally, if the player does not clear each of the stages ST1 to ST4 in each predetermined time, the game is over.

The player can obtain unconventional enjoyment such as feelings for the destruction, which is provided in unordinary cases and is filled with jokes as well as enjoyment for running in the stage while avoiding obstructions as conventional action adventure games.

[Description of Principle]

Next, the principle of the control in the present embodiment will be described.

Figure 4A:
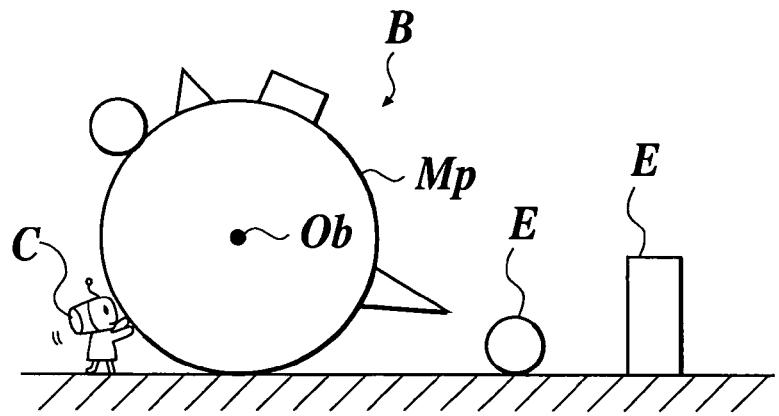
FIGS. 4A to 4C are diagrams for describing the concepts of a model configuration of the ball B.
Figure 4B:
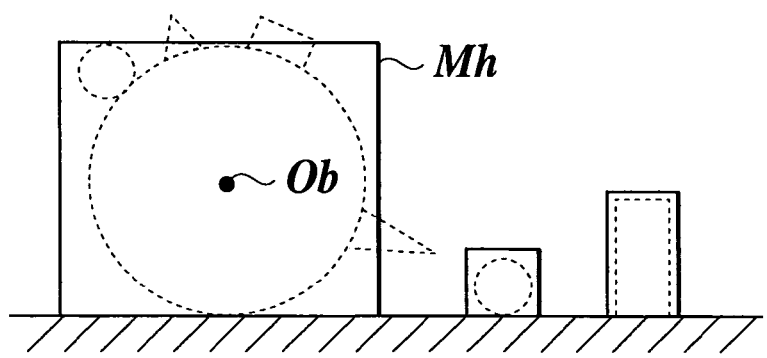
Figure 4C:
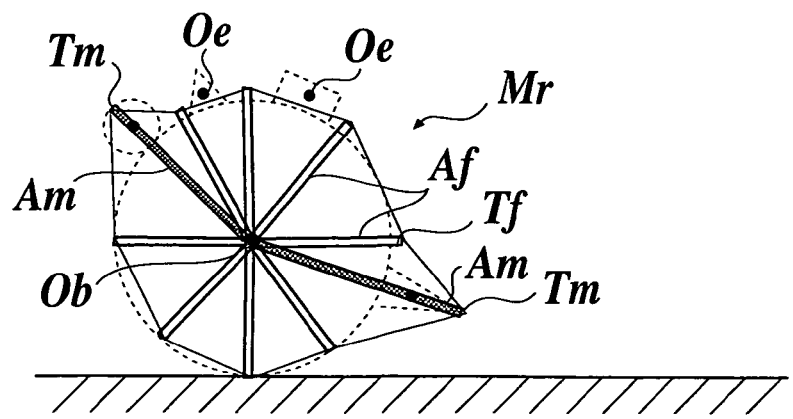

FIGS. 4A to 4C are diagrams for describing the concept of a model configuration of the ball B in the present embodiment. As described above, the present embodiment is the game in which the placement objects E are stuck to the ball B by the snowball effect. Therefore, a lot of placement objects E are stuck to the ball B with an irregular position depending on the situation. However, it requires a lot of processing loads to determine the collision and strictly calculate the rolling by using the model of ball B to which a lot of placement objects E are stuck.

Therefore, in the present embodiment, a ball display model Mpg (refer to FIG. 4A) which is actually arranged in the 3D virtual space for the display on the screen, a ball collision determination model Mh (refer to FIG. 4B) which simply represents the state where the placement objects E are stuck to the ball B, and a ball rolling model Mr (refer to FIG. 4C) which also simply represents the state where the placement objects E are stuck to the ball B and is provided for calculation of the rolling, are used.

That is, the collision is determined by the ball collision determination model Mh, the irregular ragged rolling is calculated by the ball rolling model Mr, and the game screen is displayed by executing the movement control of the ball display model Mp on the basis of the result of the calculation. Consequently, the processing load for the movement control of the ball B the shape of which is intricate and irregular is decreased.

The ball display model Mp is realized by setting parent-child relationship where a display model of the ball B to which no objects are stuck is a "parent" and a display model of the stuck placement object E is a "child".

As shown in FIG. 4B, the ball collision determination model Mh is a boundary box (also referred to as to a "bounding volume") being a rectangular solid which a sphere the volume of which is the same as the sum of the volumes of the ball B and the stuck placement objects E touches internally.

As shown in a section view of FIG. 4C, the ball rolling model Mr comprises a plurality of fixed spicular arms Af capable of displacing by extending and contracting only in predetermined radius directions (radial directions) respectively, while setting a center point Ob of the ball B as a reference point. Further, the ball rolling model Mr comprises a plurality of optional spicular arms Am capable of displaying by extending and contracting in optional radius directions from the center point Ob respectively. The optional spicular arms Am is fewer than the fixed spicular arms Af. In the present embodiment, the number of the fixed spicular arms Af is "16", and the number or the optional spicular arms is "4". Then, the ball rolling model Mr rolls in the state that a displacement point Tf which is the end of the fixed spicular arm Af and a displacement point Tm which is the end of the optional spicular arm Am are ground points.

Figure 5A:
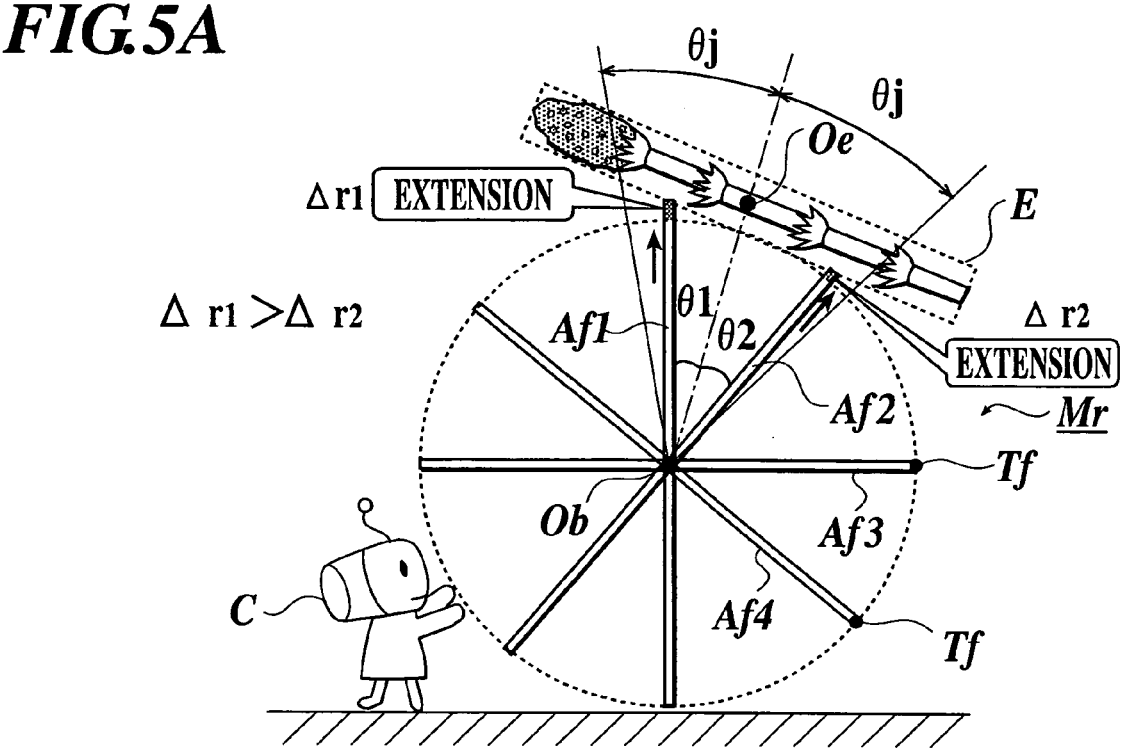
FIGS. 5A and 5B are section views for describing the setting of a fixed spicular arm Af and an optional spicular arm Am of a ball rolling model Mr.
Figure 5B:
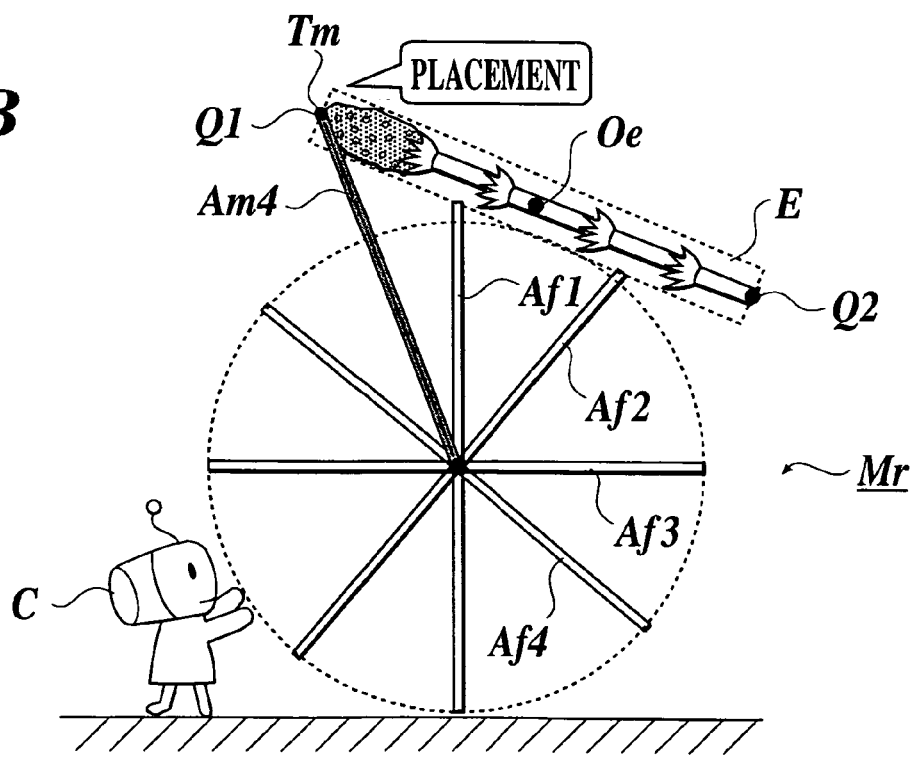

FIGS. 5A and 5B are section views for describing the setting of the fixed spicular arm Af and the optional spicular arm Am of the ball rolling model Mr. Incidentally, for the description, only the necessary fixed spicular arms Af and the necessary optional spicular arms Am are shown as Af1, Af2, Af3, Af4, Am4 and the like.

As shown in FIG. 5A, a center point Oe is set in the placement object E. When the placement object E is stuck to the ball B, the fixed spicular arm Af located within a predetermined range θj by reference to a polar coordinate θe of the center point Oe the origin of which is the center point Ob of the ball B. The displacement point Tf of the selected fixed spicular arm Af is displaced by displacement magnitude Δr (in FIG. 5A, shown as Δr1 and Δr2, as an example) corresponding to the distance from the fixed spicular arm Af to the center point Oe of the placement object E, by the Mathematical Formula 1.

displacement magnitude Δ$r$=(distance $ObOe$−current displacement point radius $r$) cos θ    [Mathematical Formula 1]

A relative angle θ (in FIG. 5A, shown as θ1 and θ2, as an example) is the angular difference between the polar coordinate of the fixed spicular arm Af to be displaced and the polar coordinate θe of the center point Oe. The current displacement point radius $r$ is the current length of a fixed spicular arm Af, and is the distance from the center point Ob to the displacement point Tf.

Therefore, regarding the fixed spicular arm Af located within the predetermined range θj from the sticking position, the closer to the sticking position of the placement object E the fixed spicular arm Af is, the larger the displacement magnitude Δr of the outward extension of the fixed spicular arm Af is. Then, the fixed spicular arm Af far from the sticking position hardly extends, because the displacement magnitude Δr is small. That is, among the displacement points Tf within the predetermined range θj, the displacement point Tf which is closer to the sticking position is set in the position which is farther from the center point Ob of the ball B, and the displace point Tf which is farther from the sticking position is set in the position which is closer to the center point Ob. Therefore, by calculating the rolling of the ball B as a polyhedron the ground point of which is a displacement point Tf, it is possible to obtain the irregular rolling movement of the mass comprising convex portion in the position adjacent to the sticking position of the stuck placement object E.

In the case of FIG. 5A, the fixed spicular arms Af1 and Af2 are located within the predetermined range θj. Further, the angle between the line segment ObOe and the fixed spicular arm Af1, and the angle between the line segment ObOe and the fixed spicular arm Af2 are relative angles θ1 and θ2 respectively. Because the fixed spicular arm Af1 is closer to the line segment ObOe, the angle θ1 is smaller than the angle θ2 (θ1<θ2). Accordingly, the displacement magnitude Δr of the fixed spicular arm Af1 is larger than that of the fixed spicular arm Af2 (Δr1>Δr2). Therefore, the fixed spicular arm Af1 extends more.

Further, as shown in FIG. 5B, outer edge representative points Q for representing the convex portion of the outer edge shape of the placement object E are set. When the placement object E is stuck to the ball B, the predetermined number of the outer edge representative points Q are selected among the outer edge representative points Q of the placement objects E which have already been stuck to the ball B, in descending order of the distances from the center point Ob (or, in descending order of the farness from the center point Ob), and the optional spicular arms Am are arranged in the position of the selected outer edge representative points Q. That is, each of the predetermined number of the displacement points Tm which are the end of the optional spicular arms Am is arranged in the most convex position depending on the situation. However, the plurality of optional spicular arms Am are not arranged to one placement object E.

In the case of the FIG. 5B, the outer edge representative points Q1 and Q2 are set on both ends of the stuck placement object E (a horsetail). If the outer edge representative points Q1 and Q2 are the first and the second farthest from the center point Ob respectively, one optional spicular arm Am is set in the position of the outer edge representative point Q1 and another optional spicular arm Am is set to outer edge representative points Q of other placement objects E, because the plurality of optional spicular arms Am are not set to one placement object E.

Figure 6:
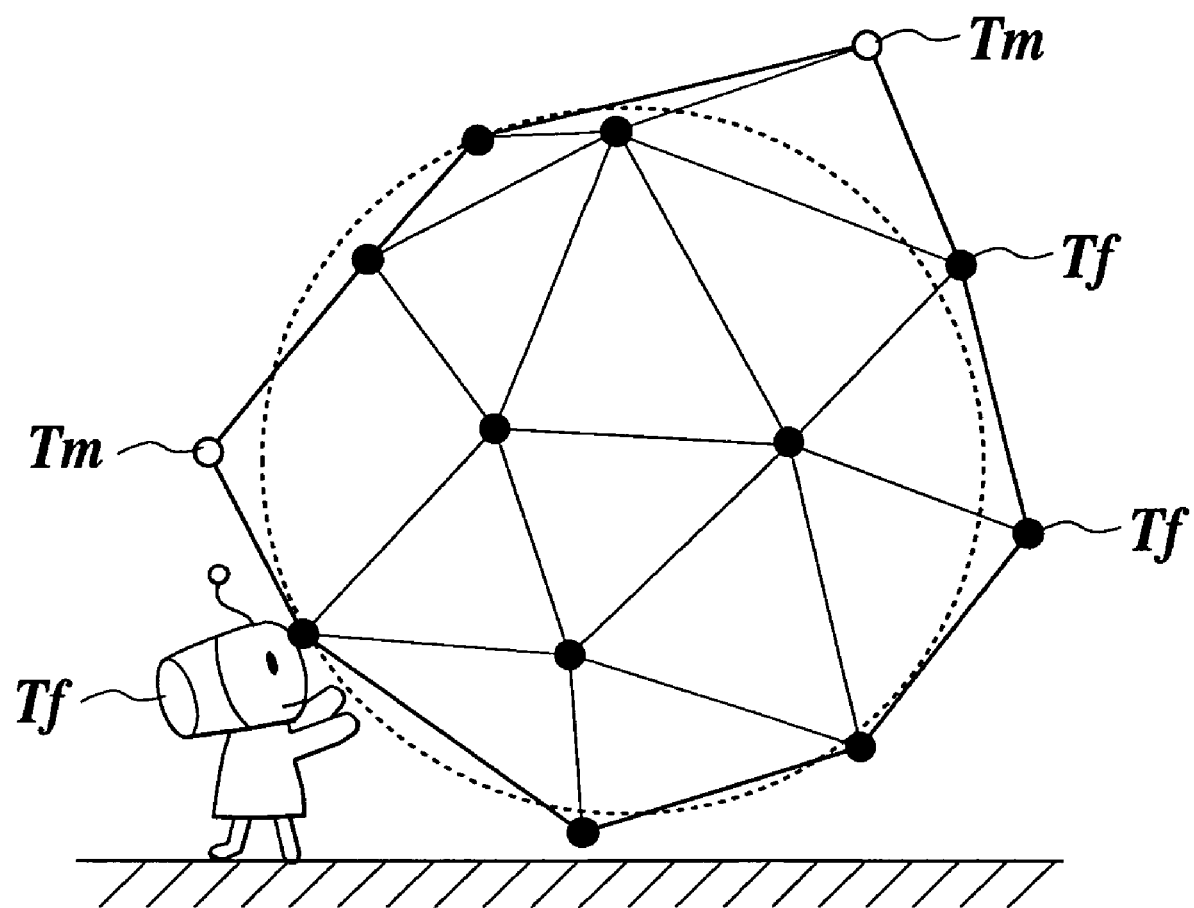
FIG. 6 is a conceptual diagram of the ball rolling model Mr.

The ball rolling model Mr formed as above may be also considered as a polyhedron shown in a conceptual diagram of FIG. 6. The ball rolling model Mr is formed in a convexo-concave shape which continues smoothly as a whole and is suitable for a certain level of smooth rolling, by the displacement points Tf on the ends of the fixed spicular arms Af. Further, the displacement points Tm on the ends of the optional spicular arms Am are provided in the state of protruding from the smoothly continuing convexo-concave shape, and embody the shapes of the characteristic convex portions of the stuck placement objects E. By calculating the rolling of the ball B on the basis of the above ball rolling model Mr, it is possible to obtain the irregular rolling movement such as the distorted rolling movement to which the irregular ragged movement element is added.

[Description of Functional Blocks]

FIG. 7 is a functional block diagram showing an example of the functional configuration of the home game unit 1200 in the present embodiment. As shown in FIG. 7, the home game unit 1200 comprises an operation input unit 10 for inputting operations of a player, a processor 20 for executing various arithmetic processing on the control of the home game unit 1200 and games, an image display unit 30 for performing the display output of a game screen, a sound output unit 40 for performing the sound output of game sounds, a communication unit 42 for embodying the data communication with an external device 44 via a communication line 2, and a memory unit 50 for storing various programs and data.

The operation input unit 10 is realized by, for example, a button switch, a lever, a dial, a mouse, a keyboard, and various sensors. The operation input unit 10 outputs operation inputs by the player into the processor 20. In the present embodiment, the game controller 1202 shown in FIG. 1 corresponds to the operation input unit 10.

The processor 20 performs various kinds of arithmetic processing such as the whole control of the home game unit 1200 and game arithmetic. The functions of the processor 20 are realized by hardware such as a CPU (CISC type or RISC type) and ASIC (such as a gate array), related control programs such as an IC memory, and the like. In FIG. 1, the control unit 1211 installed in the main unit 1210 corresponds to the processor 20.

Moreover, the processor 20 comprises a game operation unit 22 for performing arithmetic processing on games chiefly, an image generation unit 24 for generating image signals for generating an image in a virtual space in which a viewpoint is a virtual camera and for displaying a game screens from various kinds of data obtained by the processing of the game operation unit 22, a sound generation unit 26 for generating sound signals for outputting game sounds such as effective sounds and BGM, and a communication control unit 28 for performing the control on the data communication.

The game operation unit 22 executes various kinds of game processing for executing a game of the present embodiment, on the basis of the operation input signals inputted from the operation input unit 10 and the programs and data read from the memory unit 50. As the game processing, for example, the arithmetic processing for obtaining position coordinates and speeds associated with the movement of objects, collision determination (contact determination) of objects, processing for arranging objects in an object space, selection processing of mapping information for objects, processing for obtaining game results (scores), and the like can be recited. Further, the game operation unit 22 comprises a rolling control unit 221, a sticking control unit 222 and a viewpoint setting unit 225.

The rolling control unit 221 calculates the rolling of the ball B corresponding to the operation by the player, and performs the control as if the ball B moves while rolling. Concretely, the rolling control unit 221 calculates the rolling for rolling the ball B in the direction inputted with the direction key 1204, on the basis of the ball rolling model Mr. Further, the rolling control unit 221 calculates the amount of movement of the center point Ob of the ball B and the amount of rolling the origin of which is the center point Ob. Then, the rolling control unit 221 performs the movement control of the ball display model Mp according to the calculation result.

The sticking control unit 222 executes the processing on the sticking of the ball B and the placement objects E. Concretely, the sticking control unit 222 comprises a sticking management unit 222a for managing the sticking of the placement objects E and the ball B, a ball rolling model deformation unit 222c for deforming the ball rolling model Mr, a ball collision determination model deformation unit 222d for deforming the ball collision determination model Mh, and a traveling performance setting unit 222e for setting the traveling performance of the ball B.

The sticking management unit 222a calculates the ratio of the parameter value regarding the sizes of the ball B and the placement object E, when it is determined that the ball B has collided with the placement object E. Then, the sticking management unit 222a stick the placement objects E to the ball B, in the case where the calculated ratio is less than a predetermined sticking reference value.

Concretely, in the case where the ratio of a volume setting value De of the collided placement object E to a current volume Db of the ball B is less than the sticking reference value 10%, the placement object E is stuck to the ball B. When the sticking is performed, first, a contact position is calculated. Then, the sticking is realized by setting the parent-child relationship (the hierarchy relationship) in which the ball display model Mp is a "parent" and the placement object display model of the placement object E is a "child", so as to stick the placement object E to the ball B in the contact position or the vicinity of the contact position.

The ball rolling model deformation unit 222c deforms the ball rolling model Mr corresponding to the sticking of the placement objects E. Concretely, the ball rolling model deformation unit 222c selects the fixed spicular arm Af located within the predetermined range θj by reference to the polar coordinate θe of the center point Oe, while setting the center point Ob of the ball B to the origin. Then the ball rolling model deformation unit 222c displaces the fixed spicular arm Af by the displacement magnitude Δr which corresponds to the distance to the center point Oe of the placement object E. Moreover, the ball rolling model deformation unit 222c selects a predetermined number of the outer edge representative points Q among those of the stuck placement objects E, in descending order of the distance from the center point Ob, and arranges the optional spicular arms Am in the position of the selected outer edge representative points Q (refer to FIGS. 5A and 5B).

The ball collision determination model deformation unit 222d enlarges the ball collision determination model Mh of the ball B. For example, the ball collision determination model deformation unit 222d calculates the sum of the volume Db of the ball B at the time of collision and the volume setting value De of the placement object E which has been newly stuck, and updates the current volume Db of the ball B. Then, according to the updated volume Db, the ball collision determination model deformation unit 222d enlarges the ball collision determination model Mh.

The traveling performance setting unit 222e changes the values of the traveling performance parameters of the ball B, according to the current volume Db of the ball B. The traveling parameters are, for example, a maximum velocity, an acceleration, and the like. In addition, inertia or the like may be included in the traveling parameters. The amount of change of the parameter value in the present embodiment is set so that the relationship between the amount of the control by the game controller 1202 and the amount of the movement of the ball B on the game screen is almost constant. Consequently, the game play with no stress, which is provided by always-stable operational feeling, is realized, regardless of the size or the weight of the ball B.

The viewpoint setting unit 225 changes the setting of the viewpoint according to the size of the ball B. In addition to that, the viewpoint setting unit 225 sets the switching of display/non-display of the objects which are displayed extremely small on the game screen. In the present embodiment, when the size of the ball B becomes a predetermined size, the setting of the viewpoint is switched stepwise to a predetermined setting of the viewpoint. The setting of the viewpoint (a pitch angle, an angle of field or the like) is set so that the proportion of the ball B to the game screen is almost the same between the game screens before and just after the switching.

Figure 11A:
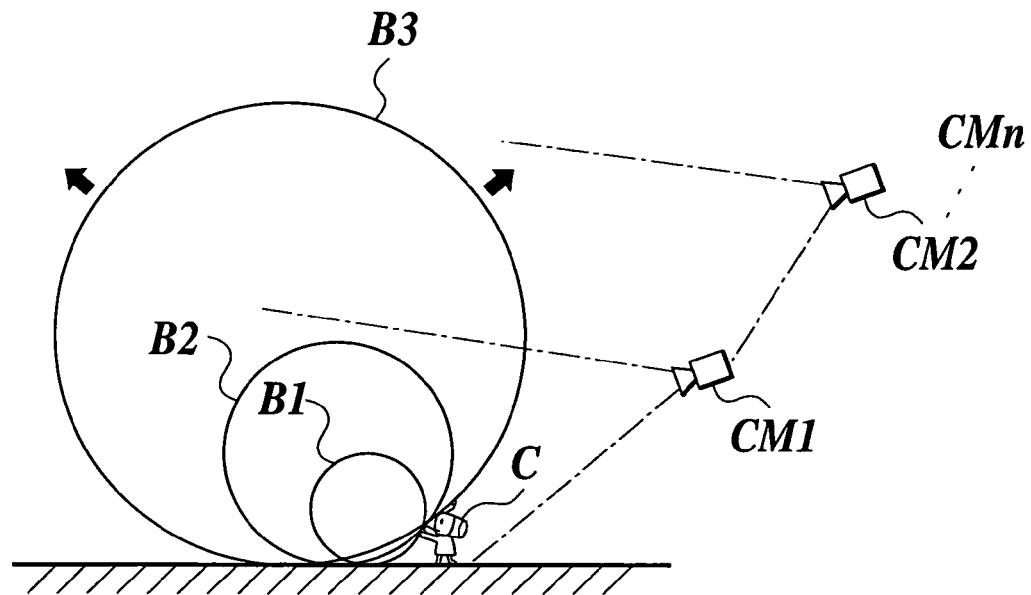
FIGS. 11A to 11E are diagrams for describing the concepts of a viewpoint switching.

FIGS. 11A to 11E are drawings for describing the concepts of the viewpoint switching in the present embodiment. As shown in FIG. 11A, the viewpoint (the virtual camera) CM is placed behind the character C which pushes the ball B. The position where the viewpoint is placed is changed and the viewpoint is switched (CM1→CM2→ . . . ) according to the size change of the ball B (B1→B2→B3 . . . ).

Figure 11B:
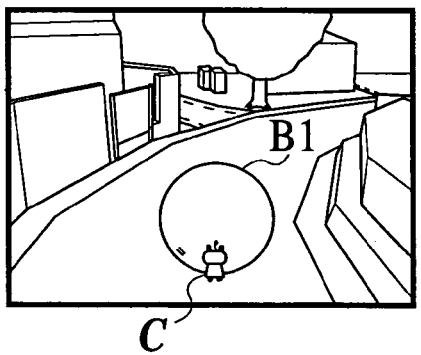
Figure 11D:
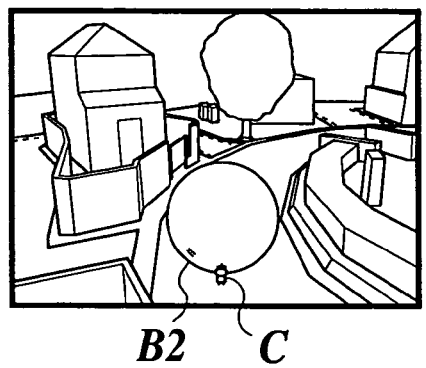
Figure 11C:
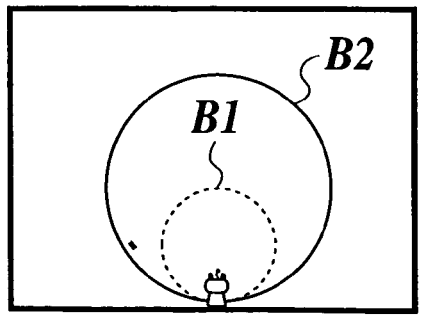
Figure 11E:
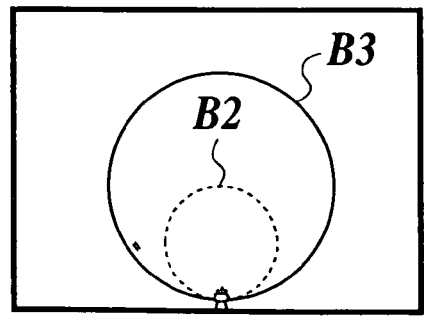

More concretely, For example, Each of FIGS. 11B to 11E shows an example of game screen. FIGS. 11B and 11C are the game screens based on the viewpoint CM1. Along with the progression of the game, the ball B grows larger from B1 to B2. In FIG. 11C, the proportion of the ball B to the game screen is increased, and it is hard for the player to look ahead of the game screen. Consequently, the viewpoint is switched from CM1 to CM2. FIGS. 11D and 11E are the game screens based on the viewpoint CM2. In FIG. 11D corresponding to the screen just after the viewpoint has been switched to CM2, the ball B is displayed on the screen with almost the same size as in the case of FIG. 11B.

The image generation unit 24 is realized by, for example, an arithmetic unit such as a CPU and a DSP, the control program of the arithmetic unit, an IC memory for a drawing frame such as a frame buffer, and the like. The image generation unit 24 executes geometrical conversion processes or shading process on the operation results based on the operation results of the game operation unit 22 to generate 3DCG images for displaying game screens, and outputs the image signals for of the generated images to the image display unit 30.

The image display unit 30 displays the game screen while redrawing one frame of a screen, for example, at every 1/60 second, on the basis of the image signals from the image generation unit 24. The image display unit 30 can be realized by hardware such as a CRT, a LCD, an ELD, a PDP, a HMD and the like. In the example of FIG. 1, the display 1220 corresponds to the image display unit 30.

The sound generation unit 26 is realized by an arithmetic unit such as a CPU and a DSP, and the control program of the arithmetic unit. The sound generation unit 26 generates sounds such as effective sounds and BGM which are used in games, and outputs the generated sound signals to the sound output unit 40.

The sound output unit 40 is a device for performing the sound output of effective sounds, BGM and the like on the basis of the sound signals from the sound generation unit 26. In the example of FIG. 1, the speaker 1222 corresponds to the sound output unit 40.

The communication unit 42 is connected to a communication line 2 for performing data communication with the external device 44. The communication unit 42 is realized by, for example, a Bluetooth (registered trademark), a module such as an IrDA, a modem, a TA, a jack of a communication cable for wired communication, a control circuit, and the like. The communication device 1218 shown in FIG. 1 corresponds to the communication unit 42. Incidentally, the information pertaining to the protocols and the like supplied by the communication unit 42 at the time of communication is stored in, for example, the memory unit 50, and the stored information is suitably read to be used.

The memory unit 50 stores a system program (not shown) for realizing the functions for making the processing unit 20 control the home game unit 1200 in an integrated manner, game information 52 storing programs and data necessary for the execution of games, and the like. Further, the memory unit 50 temporary stores various programs and data necessary for the arithmetic processing by the processor 20. The memory unit 50 can be realized by information storage medium such as various an IC memory, a hard disk, a CD-ROM, a MO, a DVD and the like. In the example of FIG. 1, the CD-ROM 1212, the IC memory 1214 and the memory card 1216 correspond to the memory unit 50.

The game information 52 includes programs and data for making the processor 20 function as the game operating unit 22. In the present embodiment, the programs especially include a rolling control program 521 for making the processor 20 function as the rolling control unit 221, a sticking control program 522 for making the processor 20 function as the sticking control unit 222, and a viewpoint setting program 525 for making the processor 20 function as the viewpoint setting unit 225.

Further, as data, the game information 52 includes viewpoint information 53, stage information 54, ball data 56 and placement object data 57 for storing information necessary for the display and the collision determination of each of the ball B and the placement object E respectively.

The viewpoint information 53 stores a viewpoint setting 531 for storing, for example, a position coordinate of the current viewpoint (virtual camera), a line of sight direction, an angle of view and a focus distance, and a viewpoint setting TBL (table) 532.

The viewpoint setting TBL 532 stores the size of the ball B and the setting of the viewpoint while connecting with each other. For example, as shown in FIG. 8, the viewpoint setting TBL stores the condition 532a on the current volume of the ball B, a viewpoint setting value 532b for storing the position of the viewpoint, the angle of view and the like, a display level 532c. The viewpoint setting unit 225 obtains the viewpoint setting value 532b and the display level 532c to control the virtual camera CM according to the current size of the ball B by reference to the viewpoint information 53.

The stage information 54 stores, for example, information for prescribing the space of the game stage, types and position information of the placement objects E to be placed in each stage, the conditions for completing the stages, and the like. In the present embodiment, the stages ST1 to ST3 are separated by the slopes SL having a predetermined gradient respectively (refer to FIG. 3). In the present embodiment, the condition for completing the game is that the ball B completely goes up the slope. However, the condition for completing the game may be set arbitrarily to the number of sticking of the particular item placed in each stage (for example, the five hundred of empty cans) or the like.

The ball data 56 includes ball display model information 561, ball collision determination model information 562, ball rolling model information 563, ball initial setting information 564, a ball parameter 565 and sticking list information 567.

The ball display model information 561 stores modeling data, texture data and the like of the ball display model Mp in the initial state where no objects are stuck to the ball B.

The ball collision determination model information 562 stores the information of the boundary box corresponding to the volume sum of the ball B and the stuck placement objects E.

The ball rolling model information 563 stores the information of the ball rolling model Mr. Concretely, the ball rolling model information 563 stores the world coordinate value of the center point Ob of the ball B, the position coordinate (the displacement point position coordinate) of each end of the fixed spicular arm Af and the optional spicular arm Am, which is the polar coordinate the origin of which is the center point Ob.

The ball initial setting information 564 stores the volume setting value Db0, the maximum velocity setting value, the weight setting value, of the ball B in the initial state where no objects are stuck to the ball B.

The ball parameter 565 stores the current parameter values of the ball B to which the placement object E is stuck. For example, the ball parameter 565 stores the current volume Db of the ball B, which is the total sum of the volume setting value Db0 of the ball B in the initial state and the volume setting value De of the stuck placement objects E, the current maximum velocity Vmax which is set according to the volume Db, the total weight of the volume setting value of the ball B in the initial state and the volumes of the stuck placement objects E, a velocity, an acceleration, a rotation angle, a minimum turning radius, and a radius.

The sticking list information 567 stores the information of the hierarchy structure in which the ball display model Mp of the ball B is a parent node (element) and the stuck placement objects E are child nodes in the order of the sticking to the ball B, and stores the parameter values of the stuck placement objects E.

For example, as shown in FIG. 9, the sticking list information 567 stores a sticking order 567a (the larger number means newer sticking), a placement object ID 567b which is the identification information of the placement objects E, sticking position information 567c for storing information showing the position and the posture of the sticking of the placement object E (for example, the position and the posture of the local origin of the placement object E), and a volume setting value 567d. The ball B displayed on the game screen is displayed as the ball display model Mp of the ball B to which the placement object E registered in the sticking list information 567 is attached in an integrated manner, and is controlled by the player.

The placement object data 57 stores information relating to the display and the collision for every placement objects E which are placed in the game space in addition to the ball B. For example, the placement object data 57 includes placement object display model information 571, placement collision determination model information 572, placement object initial setting information 573, a placement object parameter 574, placement object hierarchy information 575, and a display determination TBL 576. The placement object data 57 also includes data relating to the display form and the blending such as a value of the placement object and the texture.

The placement object display model information 571 stores the modeling data, texture data and the like of the placement object E.

The placement object collision determination model information 572 stores the modeling information of the ball collision determination model Mh of the node composing the placement object E. Incidentally, in the present embodiment, although the ball collision determination model Mh is the so-called boundary box, it may be set arbitrarily.

The placement object initial setting information 573 stores a volume setting value De and a weight setting value of the placement object E. In the case where the placement object E is the object having a moving characteristic such as an insect, the placement object initial setting information 573 stores motion data or information of the moving pattern.

The placement parameter 574 stores current various parameter values of the placement object E. For example, the placement object parameter 574 includes information such as a velocity, an acceleration, a position coordinate, a rotation angle, a representative scale and a volume setting value. In addition to that, of course, the placement object parameter 574 may include information such as a weight, a temperature, an attribute, arbitrarily.

The placement object hierarchy information 575 stores the hierarchy information of the model of the placement objects E. For example, in the case where a shovel on which a plurality of octopus dumplings are placed is appeared in a game, the shovel is set to the parent node and each of the octopus dumplings is set to the child node. Therefore, the placement object hierarchy information 575 for the octopus dumpling stores the hierarchy information in which the shovel is the parent node. When the octopus dumpling is stuck to the ball B, the placement object hierarchy information 575 for the octopus dumpling stores the hierarchy information in which the ball display model Mp of the ball B is the parent node.

The display determination TBL 576 stores, for example as shown in FIG. 10, a maximum display level 576a for showing until which level of the display level 532c of the viewpoint information 53 the placement object E is displayed, and a display flag 576b for specifying the execution/non-execution of the display and collision determination of the placement object E. According to the display determination TBL 576, by comparing the maximum display level 576a with the currently applied display level 532c for every switching of the virtual camera CM by the viewpoint setting unit 225, it is possible to determine whether or not the placement object E is displayed. In the case of FIG. 10, when the currently applied display level is equal to or more than "3", it is determined that the placement object E is not displayed, and the display flag 576b stores "0". Then, in the case where the display flag 576b is "0", the game operation unit 22 determines that the placement object E is too small to be seen, and does not place the placement object E in the virtual space. That is, the collision determination and the sticking determination of the placement object E are not performed as well.

Therefore, for example, in the case where the range displayed on the game screen is at the same level as the human visual range, the placement object E of the size of an empty can is set to be displayed. However, when the range displayed on the game screen becomes wider, the placement object of the size of an empty can is set not to be displayed. By doing as above, it is possible to maintain the viewability of the game screen and decrease processing loads.

[Description of Process Flow]

Next, the process flow in the present embodiment will be described. The process flow described hereinbelow is realized by the processor 20 by reading the rolling control program 521, the sticking control program 522 and the viewpoint setting program 525 to execute them.

Figure 12:
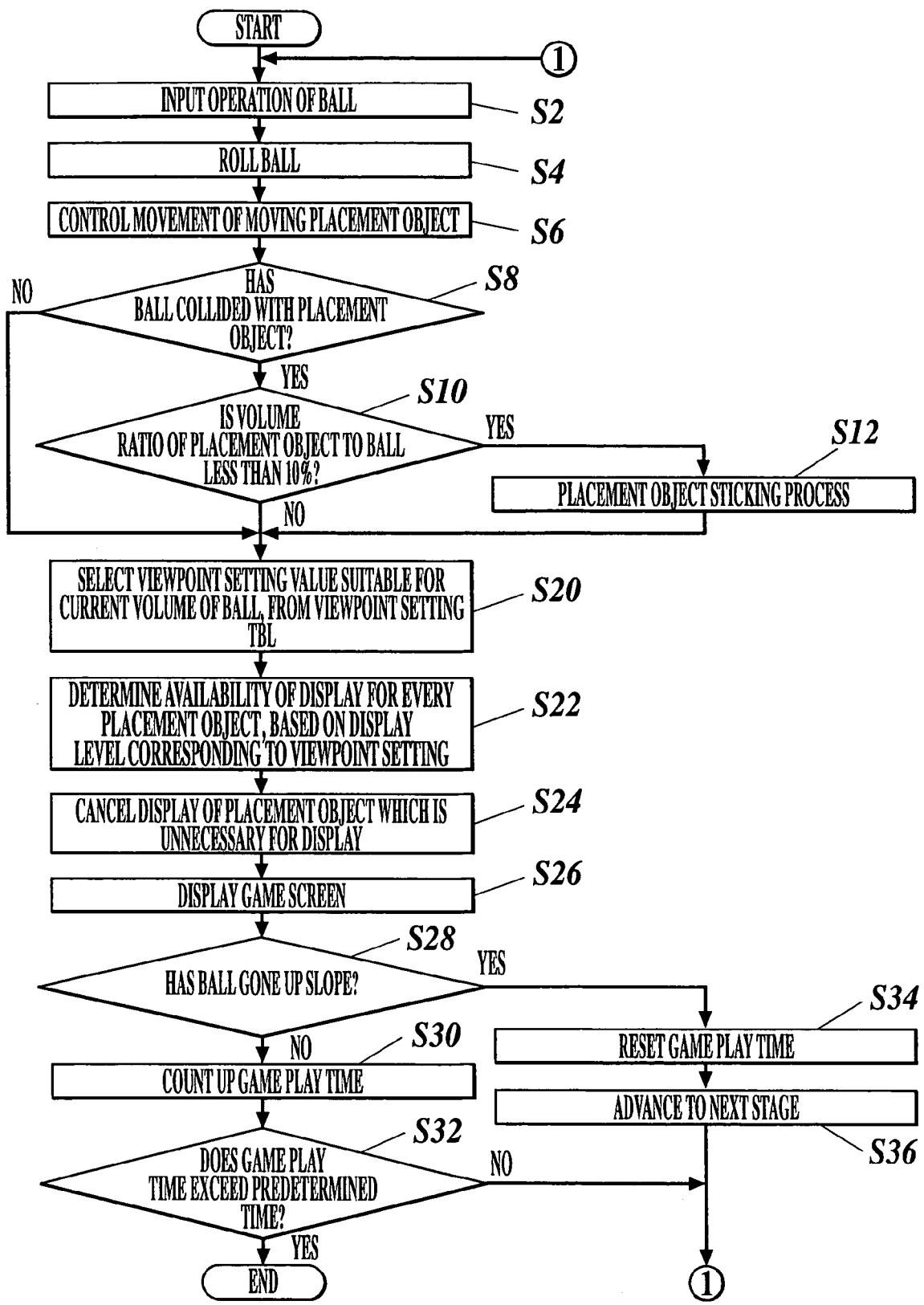
FIG. 12 is a flowchart for describing the flow of whole process of the game.

FIG. 12 is a flow chart for describing the flow of the whole process of the game in the present embodiment. As shown in FIG. 12, When the game is started and the operation of the ball B is inputted by the player (Step S2), the rolling control unit 221 of the game operation unit 22 calculates the rolling of the ball B on the basis of the ball rolling model Mr, and executes display control so as to roll the ball display model Mp on the basis of the calculation result (Step S4). Further, the game operation unit 22 calculates the movement of the placement objects having a moving characteristic such as an insect, a human and a ball rolling a slope, and executes movement control of them (Step S6).

Next, the game operation unit 22 determines whether the ball B which is rolled and moved by the operation of the player has collided with the placement object E, by using the collision determination models of them (Step S8).

When it is determined that the ball has collided with the placement object E (Step S8; Yes), the game operation unit 22 calculates the ratio (=De/Db) of the volume setting value De of the placement object E of which the collision has been determined to the current volume Db of the ball B. In the case where the ratio is less than 10% (Step S10; Yes), the sticking control unit 222 executes the placement object sticking process (Step S12).

Figure 13:
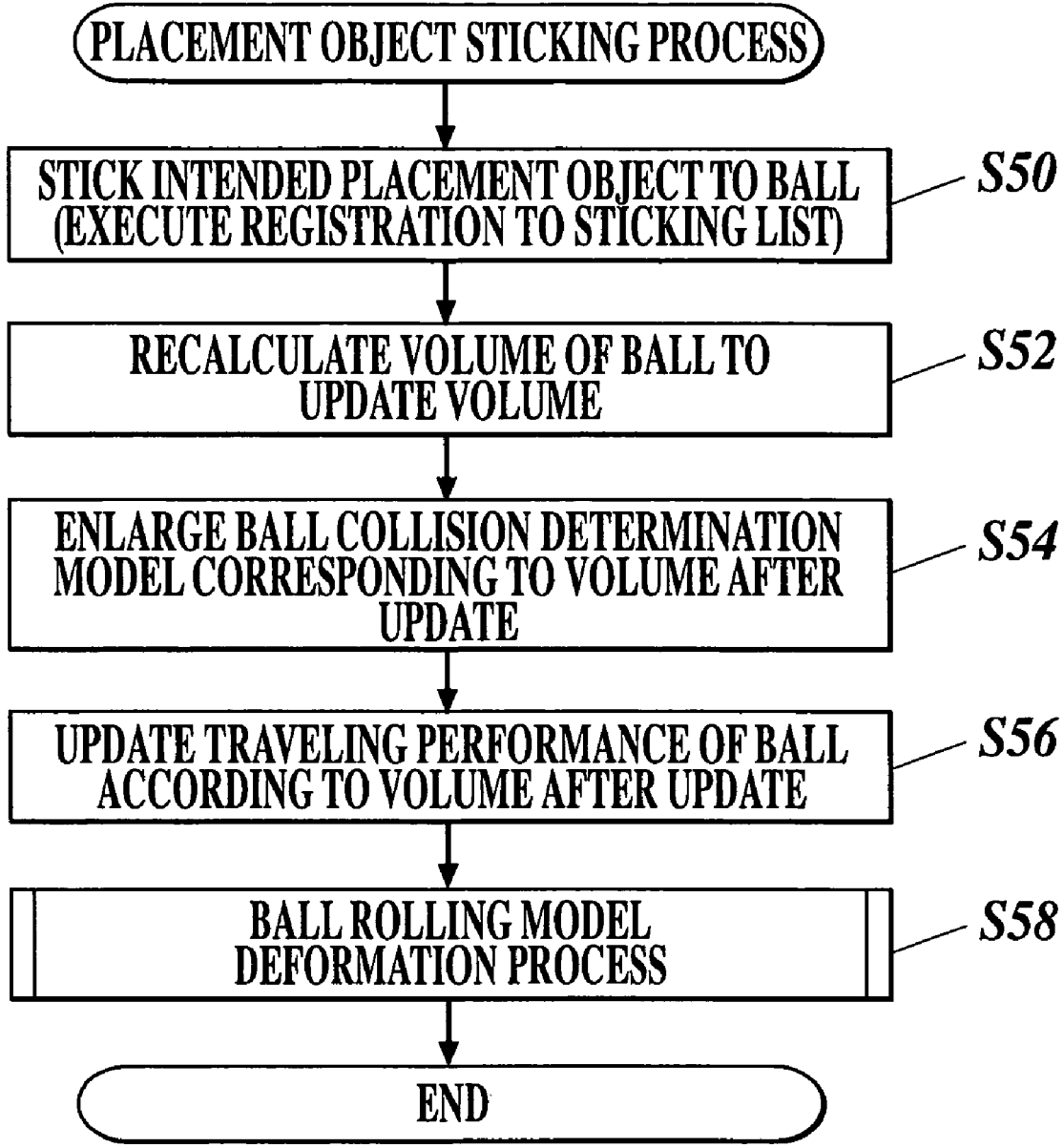
FIG. 13 is a flowchart for describing the flow of a placement object sticking process.

FIG. 13 is a flow chart for describing the flow of the placement object sticking process in the present embodiment. First, the sticking control unit 222 sticks the placement object E which has collided with the ball B, to the ball B (Step S50). Concretely, the sticking control unit 222 obtains the position where the ball B and the placement object E have collided with each other and the posture of the placement object E at the time of the collision, and registers them in the sticking list information 567. Further, the sticking control unit 222 sets the parent-child relationship in which the ball display model of the ball B in the initial state where no objects are stuck is the "parent" and the placement object E is the "child", and registers it in the sticking list information 567.

Next, the sticking control unit 222 adds the volume setting value De of the collided placement object E to the current volume Db of the ball B to update the volume Db (Step S52). Further, the sticking control unit 222 enlarges the ball collision determination model Mh, corresponding to the volume Db after the update (Step S54). For example, the sticking control unit 222 enlarges the ball collision determination model Mh with the ratio corresponding to the increases of the volume. Further, the sticking control unit 222 recalculates and updates the traveling performance of the ball B according to the volume Db after the update (Step S56). For example, the sticking control unit 222 increases the maximum velocity Vmax, as the volume Db is increased.

Next, the ball rolling model deformation unit 222c of the sticking control unit 222 executes the ball rolling model deformation process to change and deform the ball rolling model Mr according to the stuck placement object E (Step S58).

Figure 14:
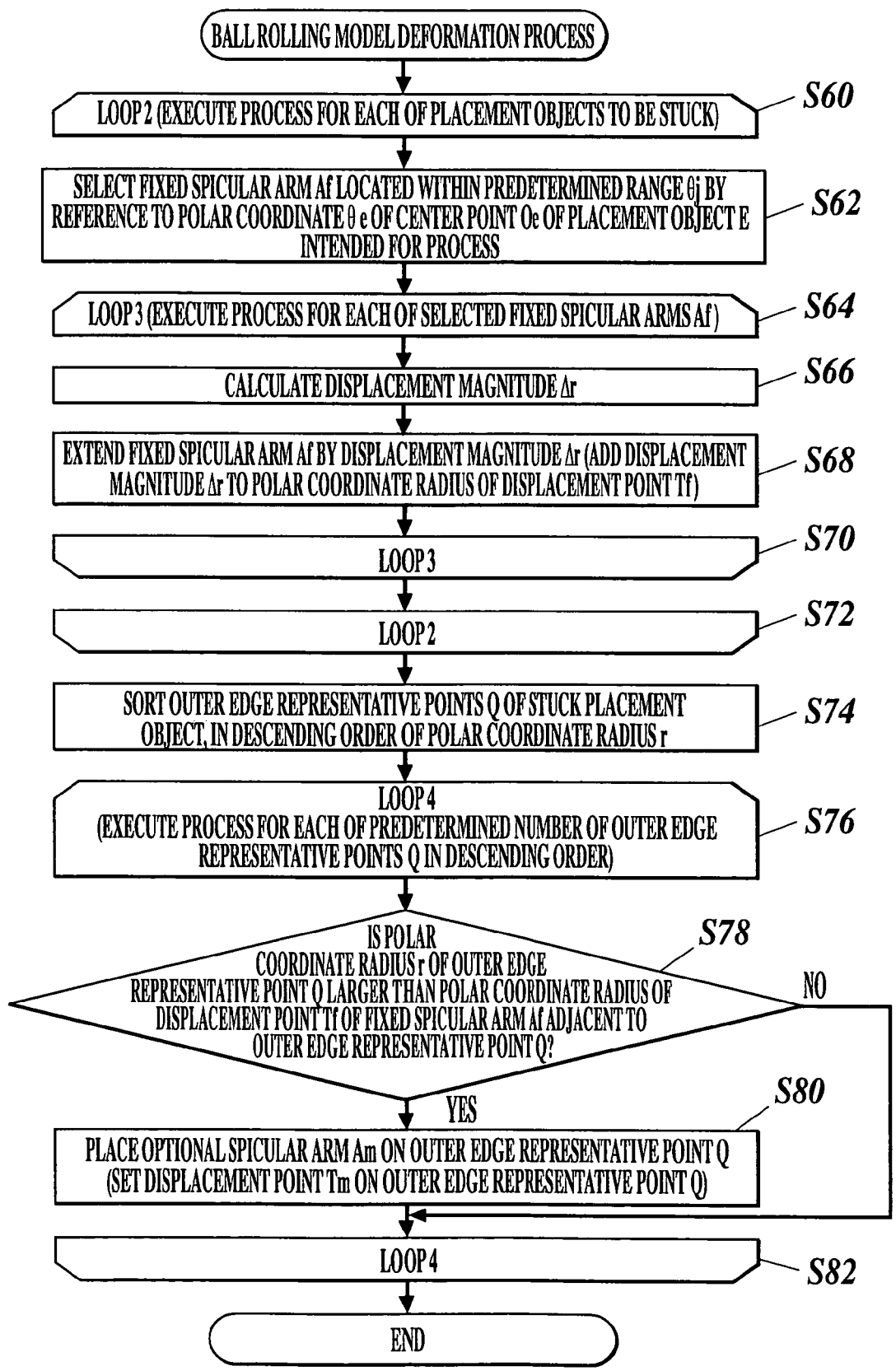
FIG. 14 is a flowchart for describing the flow of a ball rolling model deformation process.

FIG. 14 is a flow chart for describing the flow of the ball rolling model deformation process in the present embodiment. As shown in FIG. 14, the ball rolling model deformation unit 222c executes the process of the loop 2 for each of the placement objects E to be stuck (Steps S60 to S72).

In the loop 2, the ball rolling model deformation unit 222c selects the fixed spicular arm Af located within the predetermined range θj by reference to the sticking position (in the present case, the polar coordinate θe of the center point Oe) of the placement object E intended for the process (Step S62). Further, the ball rolling model deformation unit 222c executes the process of the loop 3 for each of the selected fixed spicular arms Af (Steps S64 to S70).

In the loop 3, the ball rolling model deformation unit 222c calculates the deformation magnitude Δr of the fixed spicular arm Af intended for the process, by the above-described Mathematical Formula 1 (Step S66), and extends the fixed spicular arm Af by the calculated deformation magnitude Δr.

That is, the ball rolling model deformation unit 222c adds the deformation magnitude Δr to the polar coordinate radius of the displacement point Tf (Step S68). Then, the ball rolling model deformation unit 222c ends the loop 3.

After the execution of the loop 2, the ball rolling model deformation unit 222c sorts the outer edge representative points Q of the stuck placement objects E in descending order of the polar coordinate radius r the origin of which is the center point Ob of the ball B (Step S74). Then, the ball rolling model deformation unit 222c executes the process of the loop 4 for each of the predetermined number of the outer edge representative points Q in descending order of the polar coordinate radius r (Steps S76 to S82).

In the loop 4, first, the ball rolling model deformation unit 222c compares the polar coordinate radius of the deformation point Tf adjacent to the outer edge representative point Q intended for the process, with the polar coordinate radius r of the outer edge representative point Q. In the case where the polar coordinate radius r of the outer edge representative point Q is larger than the polar coordinate radius of the adjacent deformation point Tf (Step S78; Yes), the ball rolling model deformation unit 222c sets the optional spicular arm Am so that the end of the optional spicular arm Am is the outer edge representative point Q (Step S80). Incidentally, if an optional spicular arm Am has been already set to another outer edge representative point of the placement object E comprising the outer edge representative point Q, the ball rolling model deformation unit 222c does not further set the optional spicular arm Am.

After the execution of the loop 4 for the predetermined number of the outer edge representative points Q, the ball rolling model deformation unit 222c ends the ball rolling model deformation process.

Next, in FIG. 12, in the case where the ratio of the volume setting value De of the placement object E of which the collision has been determined to the volume Db is equal to or more than 10% (Step S10; No), it is determined that the placement object E is not capable of being stuck, and the placement object E is not stuck to the ball B.

Next, the viewpoint setting unit 225 refers the viewpoint setting TBL 532 to select the viewpoint setting value 532b corresponding to the current volume Db of the ball B (Step S20).

Next, the game operation unit 22 determines the availability of the display for every placement objects E, based on the display level corresponding to the selected viewpoint setting value 532b (Step S22). Concretely, the game operation unit 22 refers the display determination TBL 576 of each of the placement objects E. Then, in the case where the maximum display Level 576a is equal to or more than the display level 532c corresponding to the selected viewpoint setting value 532b, the game operation unit 22 determines to display the placement object E, and sets the display flag 576b at "1".

In the case where the maximum display level 576a is less than the display level 532c corresponding to the selected viewpoint setting value 532b, the placement object E is relatively small in comparison with the ball B. Accordingly, the game operation unit 22 determines that the placement object E is not necessary for the display, and sets the display flag 576b at "0". Further, the game operation unit 22 cancels the display of the placement object E the flag of which is set at "0", and does not display the placement object E (Step S24).

Next, the image generation unit 24 generates a game screen, and displays the game screen on the image display unit 30 (Step S26). Incidentally, when the game sounds such as effective sounds are outputted, of course, the sound generation unit 26 generates the game sounds and the sound output unit 40 outputs them.

After the game screen has been displayed, the game operation unit 22 determines whether or not the ball B has gone up the slope placed between the stages (Step S28). A predetermined velocity is necessary for the ball B to go up each of the slopes SL. By enlarging the ball B to increase the parameter value of the maximum velocity, it becomes possible for the ball B to go up the slope.

In the case where the ball B has not gone up the slope SL yet (Step S28; No), the game operation unit 22 counts up the game play time by a predetermined time (Step S30). As the result of the count up, if the game play time exceeds an ending time (Step S32; Yes), the game is over.

On the other hand, in the case where the ball has been gone up the slope (Step S28; Yes), the game play time is reset (Step S34), and the game is advanced to the next stage (Step S36).

According to the above process, By rolling the ball B to collide with the relatively small objects E, it is possible to enlarge the ball B by the snowball effect by sticking the placement objects E thereto. By setting the game stage in a town, the player can enjoy the game filled with jokes such as enlarging the ball B while destroying the town.

[Hardware Configuration]

Figure 15:
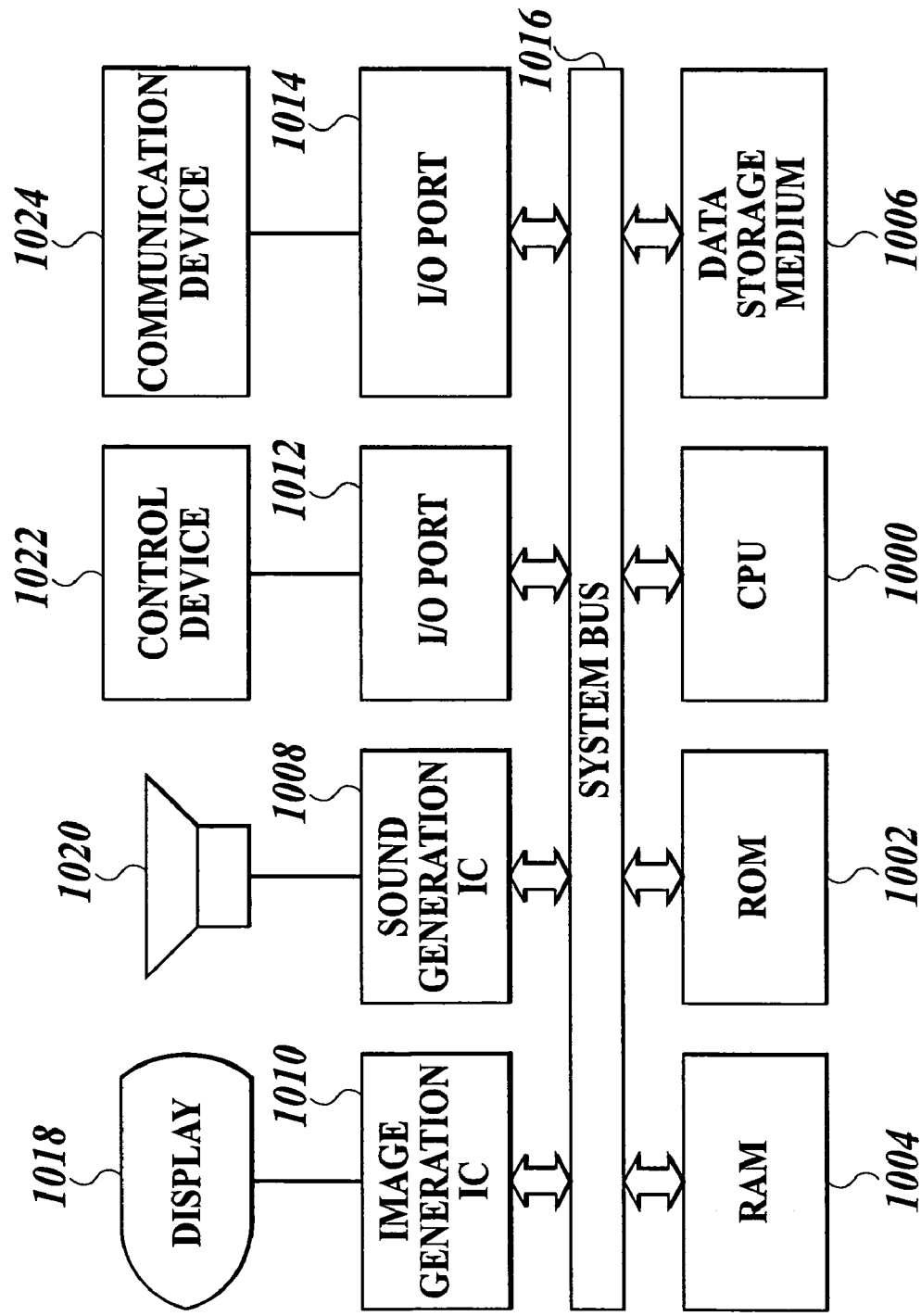
FIG. 15 is a diagram showing an example of a hardware configuration capable of realizing the home game unit to which the present invention is applied.

Next, a hardware configuration which can realize the home game unit 1200 will be described. FIG. 15 is a diagram showing an example of the hardware configuration in the present embodiment. The home game unit 1200 comprises a CPU 1000, a ROM 1002, a RAM 1004, a data storage medium 1006, a sound generation IC 1008, an image generation IC 1010, and I/O ports 1012 and 1014. They are connected to each other via a system bus 1016 so as to input/output data.

The CPU 1000 corresponds to the processing unit 20 in FIG. 7, and performs total control of the home game unit 1200 and various data processing, according to a program stored in the data storage medium 1006, a system program stored in the ROM 1002, the operation input signals inputted through the control device 1022 or the like.

The ROM 1002, the RAM 1004 and the data storage medium 1006 correspond to the memory unit 50 in FIG. 7. The ROM 1002 corresponds to the IC memory implemented in the control unit 1211 of the main unit 1210 in FIG. 1, and stores programs and data such as the system program or the like related to the control of the main unit 1210.

The RAM 1004 is a memory unit used as a work area of the CPU 1000. The RAM 1004 stores given contents in the ROM 1002 or the data storage medium 1006, results computed by the CPU 1000 or the like.

The data storage medium 1006 corresponds to the CD-ROM 1212, the IC memory 1214 and the memory card 1216 in FIG. 1, and stores the game information 72 in FIG. 7. The data storage medium 1006 is realized by an IC memory card, a removable hard disc unit, MO, DVD-ROM or the like. The data storage medium 1006 stores data stored in the ROM 1002, and loads the data to use, as needed.

The sound generation IC 1008 is an integrated circuit for generating game sounds such as sound effects and BGM based on the data stored in the data storage medium 1006 or the ROM 1002. The generated game sounds are output from a speaker 1020. The speaker 1020 corresponds to the sound output unit 40 in FIG. 7 and the speaker 1222 in FIG. 1.

The image generation IC 1010 is an integrated circuit for generating pixel information for outputting images to a display 1018. The image generation IC 1010 corresponds to the image generation unit 24 in FIG. 7. The display 1018 corresponds to the image display unit 30 in FIG. 7 and the display 1220 in FIG. 1.

A control device 1022 is connected to the I/O port 1012. A communication device 1024 is connected to the I/O port 1014. The control device 1022 corresponds to the operation input unit 10 in FIG. 7 and the game controller 1202 in FIG. 1. The control device 1022 is a device for permitting a player to input various game operation.

The communication device 1024 is designed to input/output various information to be used in the game unit to/from an external device. The communication device 1024 is connected to another game device, and used for transmitting/receiving predetermined information corresponding to the game program. The communication device 1024 is also used for transmitting/receiving the information on the game program or the like via a communication line. The communication device 1024 corresponds to the communication unit 42 in FIG. 7 and the communication device 1218 in FIG. 1.

Incidentally, the processes executed by the image generation IC 1010, the sound generation IC 1008 and the like may be executed software-wise by the CPU 1000, a general-purpose DSP or the like.

The present invention applies not only to the home game unit 1200 shown in FIG. 1, but also to various devices including an arcade game device, a mobile game device, a general-purpose computer such as a personal computer, a large-sized attraction device in which many players can participate, or the like.

Figure 16:
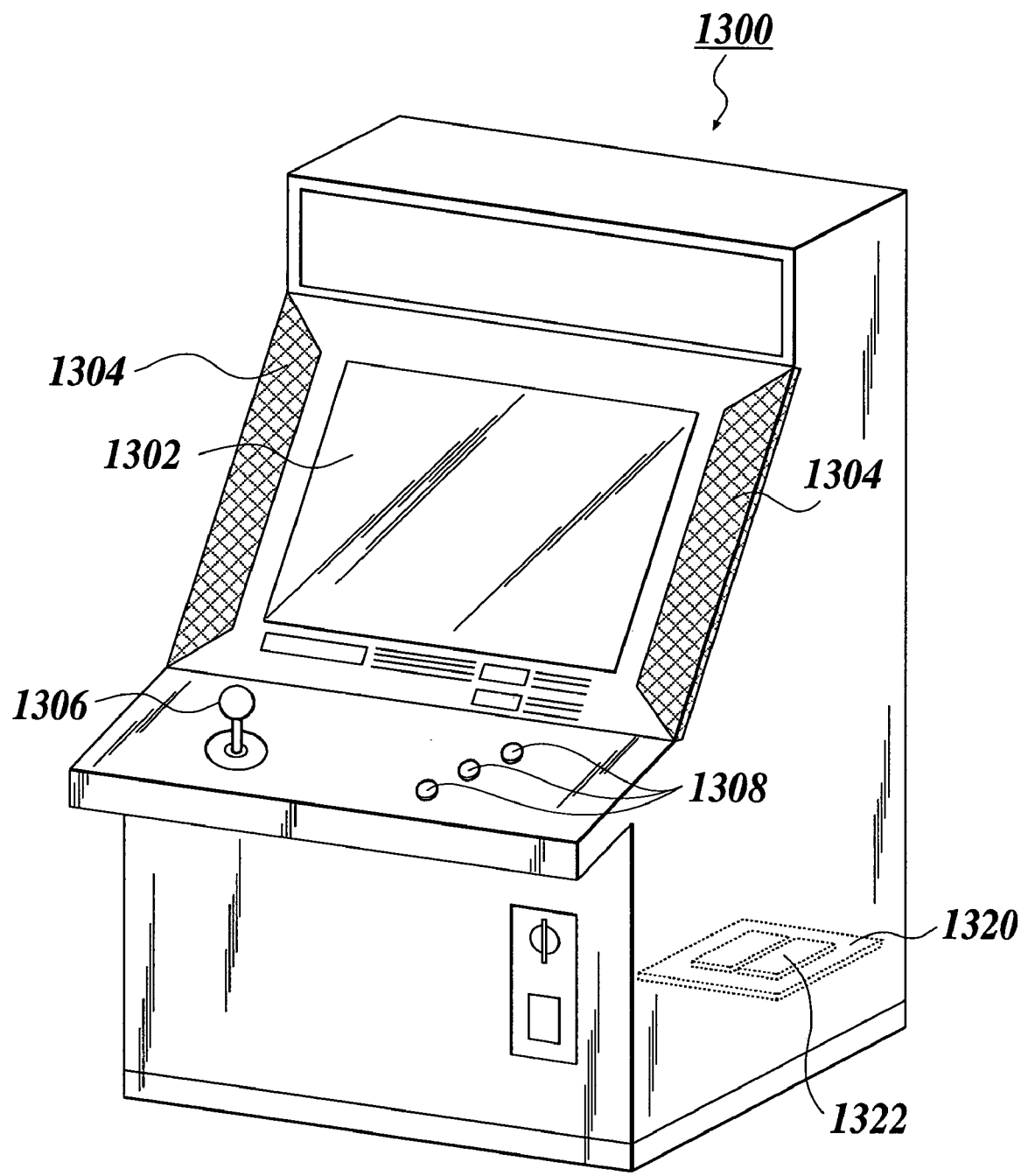
FIG. 16 is a diagram showing an example of the exterior of an arcade game apparatus to which the present invention is applied.

FIG. 16 shows an example of the exterior of an arcade game apparatus 1300 to which the present invention is applied, for example. As shown in FIG. 13, the arcade game apparatus 1300 comprises a display 1302 for displaying game screens, speakers 1304 for outputting sound effects and BGM in the game, a joystick 1306 for inputting vertical and horizontal operations, push buttons 1308, and a control unit 1320 for integrally controlling the arcade game apparatus 1300 by computer processing to execute a given game.

The control unit 1320 comprises an arithmetic processing unit such as a CPU, and a ROM 1322 in which game programs and data are stored that are required to control the arcade game apparatus 1300 and to execute the game. The CPU mounted on the control unit 1320 reads from the ROM 1322 as appropriate and computes the programs and data to execute a variety of processes. The player inputs the game operation with the joystick 1306 and push buttons 1308 while watching the game screens displayed on the display 1302 to enjoy playing the game.

Further, the present invention is not limited to the games to be executed by a stand-alone device, and may be applied to the games called network games. Examples of the system configuration for realizing a network game are as follows: (1) configuration having a home PC or home game system as a game terminal to be connected to a server via a wired/wireless communication line such as the Internet or a dedicated line network; (2) configuration connecting a plurality of game terminals to each other via a communication line without a server; (3) configuration connecting a plurality of game terminals via a communication line, one of which functions as a server; and (4) configuration physically linking a plurality of game terminals with each other to serve as a single system (for example, arcade game system).

DESCRIPTIONS OF MODIFICATION EXAMPLES

As above, the embodiment to which the present invention is applied is described. However, the application of the present invention is not limited to the above embodiment. The constituent elements may be arbitrarily added, omitted, or changed, as long as the similar operation and effect can be obtained without departing from the essence of the present invention.

In the above embodiment, for example, in order to determine whether or not the ball B and the contacted placement object E are stuck to each other, the volumes of the ball B and the placement object E are compared to each other as the information on the sizes. However, not limited to the volumes, for example, weights, temperatures, classifications of material, or colors may be compared to each other. For example, in the case where the weights are compared to each other, initial setting values of the weights are defined beforehand in each of the initial information of the ball B and the placement object E respectively. Further, the sticking list information 567 stores not the volume setting value 567d but a weight setting value.

Further, in the above embodiment, the representative point of each of the placement objects E is set to the center point Oe. However, the representative point does not always mean the center of the shape, and for example, the position corresponding to the center of gravity or the center of moment may be set as the representative point. For example, in the case where the placement object E is a leafy pineapple (fruit), it is more preferable that the leaf portion is not considered daringly and the position corresponding to the center of gravity of the berry portion is set to the representative point, because the leaf portion which is soft and easily deformable can be made not to affect rolling.

The entire disclosure of Japanese Patent Application No. Tokugan 2003-333580 filed on Sep. 25, 2003 including specification, claims, drawings and summary are incorporated herein by reference in its entirety.

What is claimed is:

1. A game performing method for executing a given game by arranging a plurality of objects comprising a plurality of objects to be stuck and an operation object, in a 3D virtual space, controlling rolling and movement of the operation object according to operation input by a player via an input device, and rolling and moving the operation object while sticking the objects to be stuck which the operation object comes in contact with, the method comprising:

setting a plurality of first displacement points capable of displacing only in predetermined radial directions from a reference point in the operation object respectively, the radial directions being different from each other;

displacing a first displacement point from among the plurality of first displacement points in its respective predetermined radial direction when the operation object comes in contact with an object to be stuck, the first displacement point to be displaced being adjacent to a position where the operation object comes in contact with the object to be stuck;

setting a second displacement point in a position where a distance from the reference point to a predetermined part of the object stuck to the operation object meets a predetermined distance condition;

controlling the rolling of the operation object on a basis of rolling surface reference points comprising the first displacement point and the second displacement point; and outputting an output to a display device, based upon the 3D virtual space.

2. The method as claimed in claim 1, wherein the setting the second displacement includes selecting a predetermined number of positions of parts among predetermined parts of the objects stuck to the operation object, in descending order of a distance from each predetermined part to the reference point, and sets the second displacement point in a selected position.

3. The method as claimed in claim 1, wherein the setting the second displacement includes determining whether or not the second displacement point is set in the position of the predetermined part of the object stuck to the operation object on a basis of a distance from the reference point to the first displacement point.

4. The method as claimed in claim 1,
wherein a convex identification point based on a shape of the object to be stuck is set beforehand in the object to be stuck, and
the predetermined part of the object to be stuck is the convex identification point.

5. The method as claimed in claim 1,
wherein a representative point is set beforehand in the object to be stuck, and
the displacing the first displacement point includes selecting the first displacement point to be displaced on a basis of a positional relationship between a representative point of a contacted object to be stuck and the first displacement point.

6. The method as claimed in claim 1, wherein the displacing the first displacement point includes deciding displacement magnitude on a basis of a distance between a representative point of a contacted object to be stuck and the first displacement point.

7. A game performing method for executing a given game by moving an operation object according to operation input by a player via an input device, the operation object comprising a predetermined number of displacement points, the method comprising:

displacing a displacement point from among the predetermined number of displacement points on a basis of a position of a predetermined representative point of an object arranged in a 3D virtual space, when it is determined that the operation object comes in contact with the arranged object; and outputting an output to a display device, based upon the 3D virtual space.

8. A game performing method for executing a given game by arranging an operation object comprising a predetermined number of displacement points, and an object to be stuck which is capable of being stuck to the operation object, in a 3D virtual space, and moving the operation object according to operation input by a player via an input device, the method comprising:

displacing a displacement point from among the predetermined number of displacements points on a basis of a position of a predetermined representative point of the object to be stuck, when the object to be stuck is stuck to the operation object; and outputting an output to a display device, based upon the 3D virtual space.

9. A game apparatus for executing a given game by arranging a plurality of objects comprising a plurality of objects to be stuck and an operation object, in a 3D virtual space, controlling rolling and movement of the operation object according to operation input by a player via an input device, and rolling and moving the operation object while sticking the objects to be stuck which the operation object comes in contact with, the apparatus comprising:

- a first displacement point setting section for setting a plurality of first displacement points capable of displacing only in predetermined radial directions from a reference point in the operation object respectively, the radial directions being different from each other, and for displacing a first displacement point from among the plurality of first displacement points in its respective predetermined radial direction when the operation object comes in contact with an object to be stuck, the first displacement point to be displaced being adjacent to a position where the operation object comes in contact with the object to be stuck;
- a second displacement point setting section for setting a second displacement point in a position where a distance from the reference point to a predetermined part of the object stuck to the operation object meets a predetermined distance condition; and
- a rolling control section for controlling the rolling of the operation object on a basis of rolling surface reference points comprising the first displacement point set by the first displacement point setting section and the second displacement point set by the second displacement point setting section.

10. A game apparatus for executing a given game by moving an operation object according to operation input by a player via an input device, the operation object comprising a predetermined number of displacement points, the apparatus comprising a section for displacing a displacement point from among the predetermined number of displacements points on a basis of a position of a predetermined representative point of an object arranged in a 3D virtual space, when it is determined that the operation object comes in contact with the arranged object.

11. A game apparatus for executing a given game by arranging an operation object comprising a predetermined number of displacement points, and an object to be stuck which is capable of being stuck to the operation object, in a 3D virtual space, and moving the operation object according to operation input by a player via an input device, the apparatus comprising displacing the displacement point from among the predetermined number of displacements points on a basis of a position of a predetermined representative point of the object to be stuck, when the object to be stuck is stuck to the operation object.

12. A storage medium having information recorded thereon, when the information is loaded onto an operating device, the information making the operating device execute the method as claimed in claim 1.

13. A storage medium having information recorded thereon, when the information is loaded onto an operating device, the information making the operating device execute the method as claimed in claim 7.

14. A storage medium having information recorded thereon, when the information is loaded onto an operating device, the information making the operating device execute the method as claimed in claim 8.

15. A recording medium readable by a device storing a program, the program making the operating device execute the method as claimed in claim 1.

16. A recording medium readable by a device storing a program, the program making the operating device execute the method as claimed in claim 7.

17. A recording medium readable by a device storing a program, the program making the operating device execute the method as claimed in claim 8.

* * * * *